(12) United States Patent
Sugaya

(10) Patent No.: US 10,721,618 B2
(45) Date of Patent: Jul. 21, 2020

(54) WIRELESS COMMUNICATION DEVICE AND WIRELESS COMMUNICATION METHOD

(71) Applicant: Sony Corporation, Tokyo (JP)

(72) Inventor: Shigeru Sugaya, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/098,447

(22) PCT Filed: Apr. 26, 2017

(86) PCT No.: PCT/JP2017/016457
§ 371 (c)(1),
(2) Date: Nov. 2, 2018

(87) PCT Pub. No.: WO2017/221547
PCT Pub. Date: Dec. 28, 2017

(65) Prior Publication Data
US 2019/0149983 A1    May 16, 2019

(30) Foreign Application Priority Data
Jun. 22, 2016    (JP) .................... 2016-123624

(51) Int. Cl.
H04M 3/00    (2006.01)
H04W 8/24    (2009.01)
(Continued)

(52) U.S. Cl.
CPC .......... *H04W 8/24* (2013.01); *H04W 4/06* (2013.01); *H04W 24/02* (2013.01); *H04W 88/06* (2013.01);
(Continued)

(58) Field of Classification Search
None
See application file for complete search history.

(56) References Cited

U.S. PATENT DOCUMENTS

2011/0149816 A1    6/2011    Saito et al.
2014/0177613 A1    6/2014    Baker et al.
(Continued)

FOREIGN PATENT DOCUMENTS

JP    2007-67723 A    3/2007
JP    2008-263621 A    10/2008
(Continued)

OTHER PUBLICATIONS

Extended European Search Report dated Apr. 30, 2019 in European Application No. 17815018.1.
(Continued)

*Primary Examiner* — Suhail Khan
(74) *Attorney, Agent, or Firm* — Xsensus LLP

(57) ABSTRACT

A wireless communication device includes: a control unit configured to control generation of a participation request frame relating to a request for participation in a group, which includes at least one wireless communication device, in which role information specifying a communication role in communication with an outside of the group is stored on a basis of group information regarding the group; and a transmission unit configured to transmit the participation request frame. A wireless communication device including: a transmission unit configured to transmit a report frame in which group information regarding a group including at least one wireless communication device is stored; and a reception unit configured to receive a participation request frame relating to a request for participation in the group in which role information specifying a communication role in communication with an outside of the group is stored.

16 Claims, 24 Drawing Sheets

(51) Int. Cl.
*H04W 4/06* (2009.01)
*H04W 24/02* (2009.01)
*H04W 88/06* (2009.01)
*H04W 88/18* (2009.01)
*H04W 84/12* (2009.01)
*H04W 8/18* (2009.01)

(52) U.S. Cl.
CPC ............ *H04W 88/18* (2013.01); *H04W 8/186* (2013.01); *H04W 84/12* (2013.01)

(56) References Cited

U.S. PATENT DOCUMENTS

2016/0057567 A1  2/2016  Nakagawa
2017/0048788 A1*  2/2017  Chen ....................... H04L 29/08

FOREIGN PATENT DOCUMENTS

JP   2014-529247 A   10/2014
WO   2009/107245 A1   9/2009

OTHER PUBLICATIONS

English-language Translation of International Search Report and Written Opinion for International Application No. PCT/JP2017/016457, dated Jul. 18, 2017.

* cited by examiner

FIG. 9

| Element ID | Length | Object ID | Function Code | Attribute | Capability | Category | ... |
|---|---|---|---|---|---|---|---|

Information element

FIG. 10

| Status Information | | | | | | |
|---|---|---|---|---|---|---|
| Header | | Payload | | | | CRC |
| Source Address | Destination Address | Protocol Version | Object ID | Function Code | Operation Status | Status Code |

FIG. 11

| Object Management Information | | | | | |
|---|---|---|---|---|---|
| Object ID | Object Attribute | Number of Device | Device Information 1 | ... | Device Information N |
| | | | MAC Address / Function Code | | MAC Address / Function Code |

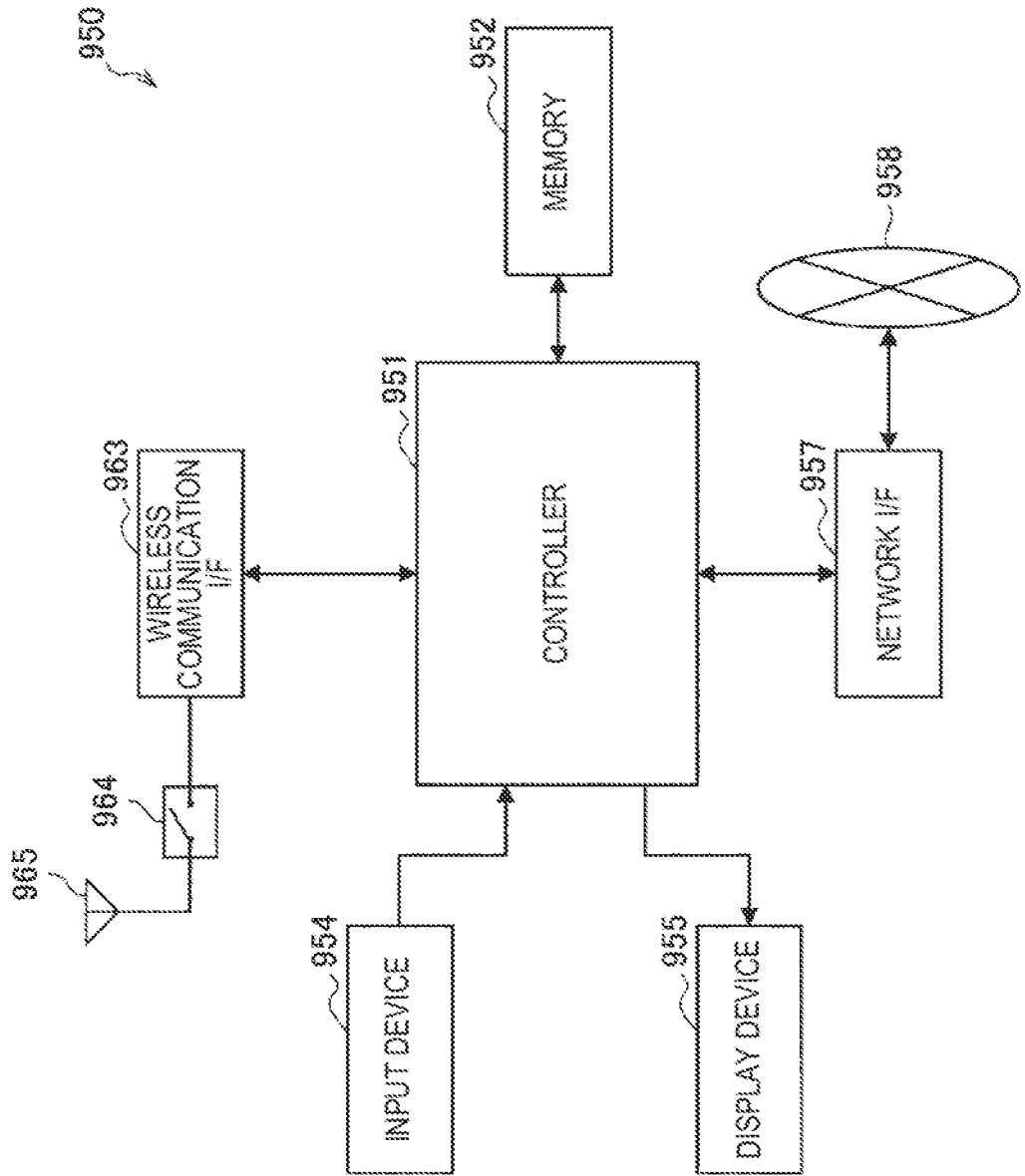

WIRELESS COMMUNICATION DEVICE AND WIRELESS COMMUNICATION METHOD

CROSS-REFERENCE TO RELATED APPLICATIONS

This application is a National Stage Application based on PCT/JP2017/016457, filed 26 Apr. 2017, and claims priority to Japanese Patent Application No. 2016-123624 on 22 Jun. 2016, the entire contents of which being incorporated herein by reference.

TECHNICAL FIELD

The present disclosure relates to a wireless communication device and a wireless communication method.

BACKGROUND ART

As communication technologies have progressed in recent years, communication methods in various forms have been researched and developed. Specifically, there are technologies for wireless communication devices to perform wireless communication via another wireless communication device. Patent Literature 1, for example, discloses a technology in which a wireless communication device includes a wireless communication unit and the wireless communication unit performs wireless communication by controlling a wireless frequency module included in another wireless communication device via a wireless communication link between the wireless communication unit and the other wireless communication device.

CITATION LIST

Patent Literature

Patent Literature 1: JP 2014-529247T

DISCLOSURE OF INVENTION

Technical Problem

In the technology disclosed in Patent Literature 1, however, costs are incurred with respect to the wireless communication devices from various viewpoints. For example, all functions including a transmission function, a reception function, and a function of wireless communication link between wireless communication devices are necessary for a plurality of disclosed wireless communication devices. Thus, costs are incurred to manufacture the wireless communication devices. In addition, when all the reception function and the function of a wireless communication link between wireless communication devices are caused to work, costs are incurred from the viewpoint of power consumption or calculation resources. In particular, since the capacities of batteries of the wireless communication devices are generally limited, it is desirable to reduce the power consumed as much as possible.

Therefore, the present disclosure proposes a novel and improved mechanism that can reduce costs incurred for wireless communication devices while maintaining wireless communication functions.

Solution to Problem

According to the present disclosure, there is provided a wireless communication device including: a control unit configured to control generation of a participation request frame relating to a request for participation in a group, which includes at least one wireless communication device, in which role information specifying a communication role in communication with an outside of the group is stored on a basis of group information regarding the group; and a transmission unit configured to transmit the participation request frame.

In addition, according to the present disclosure, there is provided a wireless communication device including: a transmission unit configured to transmit a report frame in which group information regarding a group including at least one wireless communication device is stored; and a reception unit configured to receive a participation request frame relating to a request for participation in the group in which role information specifying a communication role in communication with an outside of the group is stored.

In addition, according to the present disclosure, there is provided a wireless communication method using a processor, the wireless communication method including: generating a first frame in which role information specifying a communication role in communication with an outside of a group including at least one wireless communication device set for the group is stored; and transmitting the first frame.

Advantageous Effects of Invention

According to the present disclosure described above, a mechanism that can reduce costs incurred for wireless communication devices while maintaining wireless communication functions is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is a diagram illustrating an example of a configuration of a role information element communicated by a communication device according to an embodiment of the present disclosure.

FIG. 10 is a diagram illustrating an example of a configuration of a status information signal according to an embodiment of the present disclosure.

FIG. 11 is a diagram illustrating an example of a configuration of object management information to be registered for communication devices according to an embodiment of the present disclosure.

FIG. 24 is a block diagram illustrating an example of a schematic configuration of a wireless access point.

MODE(S) FOR CARRYING OUT THE INVENTION

Figure 1:
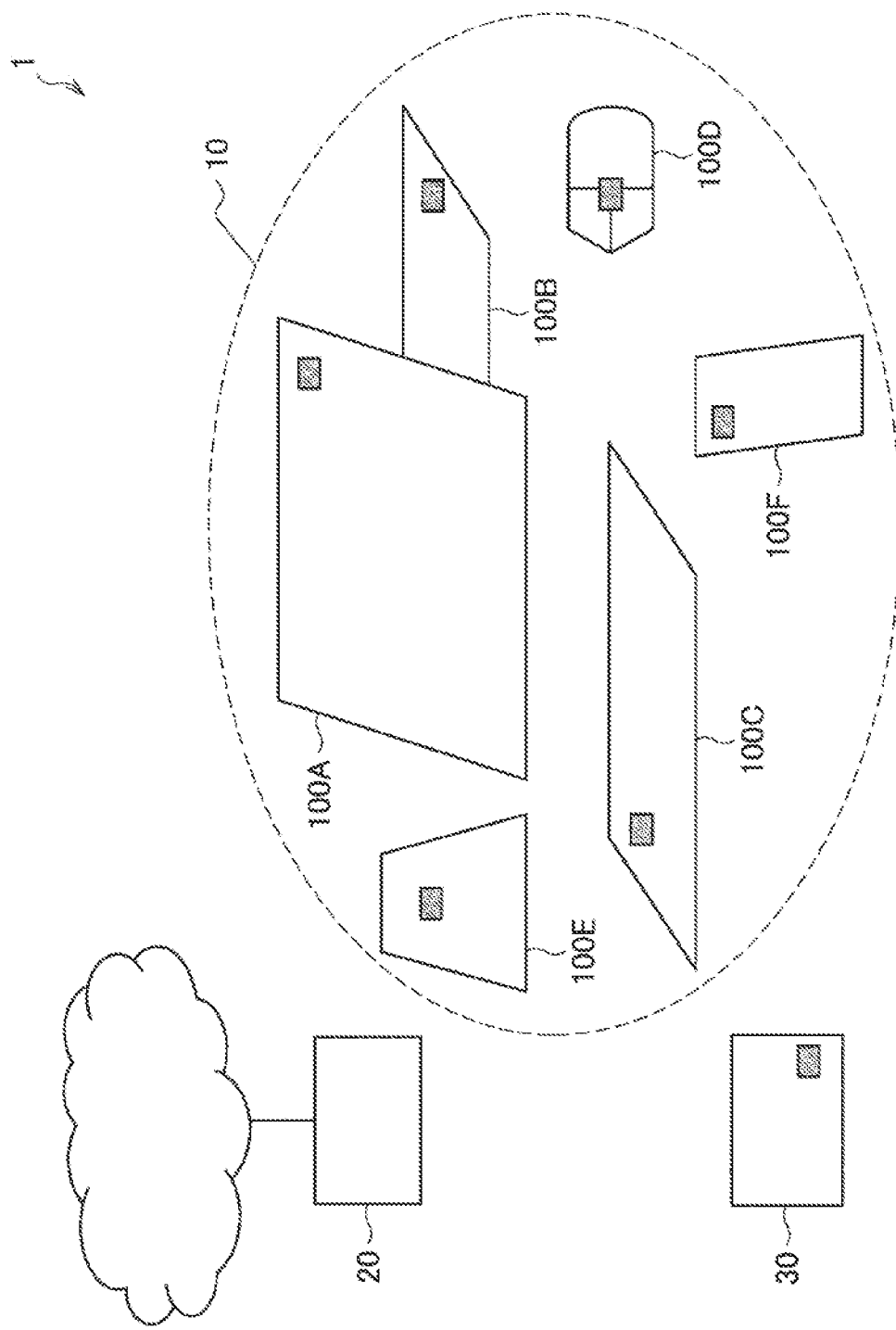
FIG. 1 is a diagram illustrating an example of a physical configuration of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a communication device 100A and a communication device 100B. However, in a case where it is unnecessary to distinguish elements having substantially the same function, only the same reference numeral is added. For example, in a case where it is unnecessary to particularly distinguish the communication device 100A and the communication device 100B, they are simply referred to as "communication devices 100."

Note that description will be provided in the following order.
1. Embodiment of present disclosure
1.1. Configuration of system
1.2. Configuration of device
1.3. Function of device
1.4. Process of device
1.5. Summary of embodiment of present disclosure
2. Modified examples
3. Application examples
4. Conclusion

1. EMBODIMENT OF PRESENT DISCLOSURE

Communication devices 100 and a communication system having the communication devices 100 according to an embodiment of the present disclosure will be described.

1.1. Configuration of System

Figure 2:
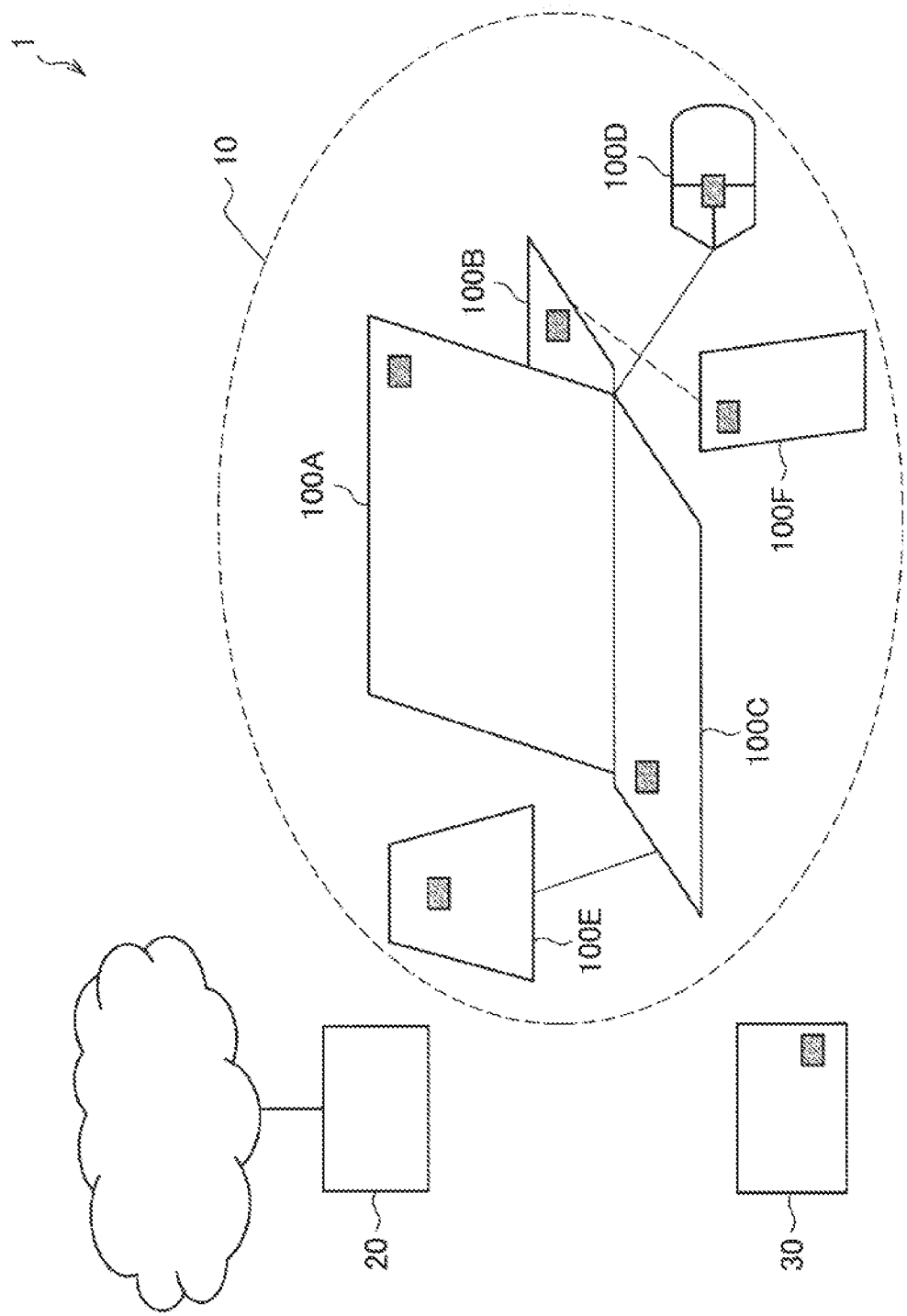
FIG. 2 is a diagram illustrating an example of a physical configuration of a communication system according to an embodiment of the present disclosure.

First, a configuration of the communication system according to an embodiment of the present disclosure will be described with reference to FIGS. 1 and 2. FIGS. 1 and 2 are diagrams illustrating an example of a physical configuration of the communication system according to an embodiment of the present disclosure.

The communication system 1 according to the embodiment of the present disclosure includes a plurality of communication devices 100, an access point (which will also be referred to as AP (Access Point) below) 20, and an authentication server 30 as illustrated in FIG. 1.

[Communication Device]

The communication devices 100 have communication functions and communicate with the AP 20 or the authentication server 30. For example, the communication devices 100 A to 100F may each include a wireless communication module indicated by a dot in FIG. 1 having a communication function of at least one of transmission or reception and communicate with the AP 20 or the authentication server 30 using the wireless communication module.

Here, the communication devices 100 may be devices having various functions. For example, the communication device 100A may be a display having a display function, the communication device 100B may be a memory having a storage function, the communication devices 100C and 100D may be a keyboard and a mouse having input functions, the communication device 100E may be a speaker having a sound output function, and the communication device 100F may be a smartphone having a function of executing an advanced calculation process.

In addition, a plurality of communication devices 100 form a group called an object and perform communication in units of a group. For example, one object 10 may be formed by physically connecting the communication devices 100A to 100E and logically connecting the communication device 100F to the communication devices 100A to 100E as illustrated in FIG. 2.

In addition, each of the communication devices 100 forming the object 10 has a communication role, and thus communication from the object 10 with an external communication device is performed in accordance with the communication role. For example, the communication devices 100A and 100E have a communication role called reception, and thus receive signals from the AP 20 or the authentication server 30. In addition, the communication devices 100C and 100D have a communication role called transmission and thus transmit signals to the AP 20 or the authentication server 30. Note that the communication devices 100B and 100F has both of the communication roles of transmission and reception. In addition, the communication role called transmission or reception corresponds to an output or an input of an application (which will also be referred to as an object application below) that operates commonly for the object 10. Thus, the communication devices 100A and 100E can also be called output devices for the object application, and the communication devices 100C and 100D can also be called input devices for the object application. The communication devices 100A and 100E perform, for example, image display and sound output on the basis of image information, video information, or sound information received via the AP 20.

In addition, the communication devices 100 may communicate with other communication devices 100 included in the object 10. For example, the communication device 100F transmits information regarding an image obtained by capturing of a built-in image sensor to the communication device 100A. The communication device 100A that has received the image information displays an image on the basis of the image information.

[AP]

The AP 20 is connected to an external network and allows the communication devices 100 to communicate with the external network. For example, the AP 20 is connected to the Internet and provides communication between the communication devices 100 and a communication device on the Internet or communication with a communication device connected via the Internet. Note that communication with a base station in mobile telephone communication (cellular communication) may be performed, on behalf of the AP 20.

[Authentication Server]

The authentication server 30 provides an authentication service to the communication devices 100. For example, the authentication server 30 performs authentication of the communication devices 100 desiring provision of a service for a service that requires authentication for provision. Note that authentication may be performed using communication via the Internet, and in this case, the authentication server 30 performs communication for authentication via the AP 20. Note that the authentication server 30 may not be provided in the communication system 1.

1.2. Configuration of Device

Next, a configuration of a communication device 100 for realizing the above-described communication system 1 will be described. A functional configuration of the communication device 100 will be described with reference to FIG. 3.

Figure 3:
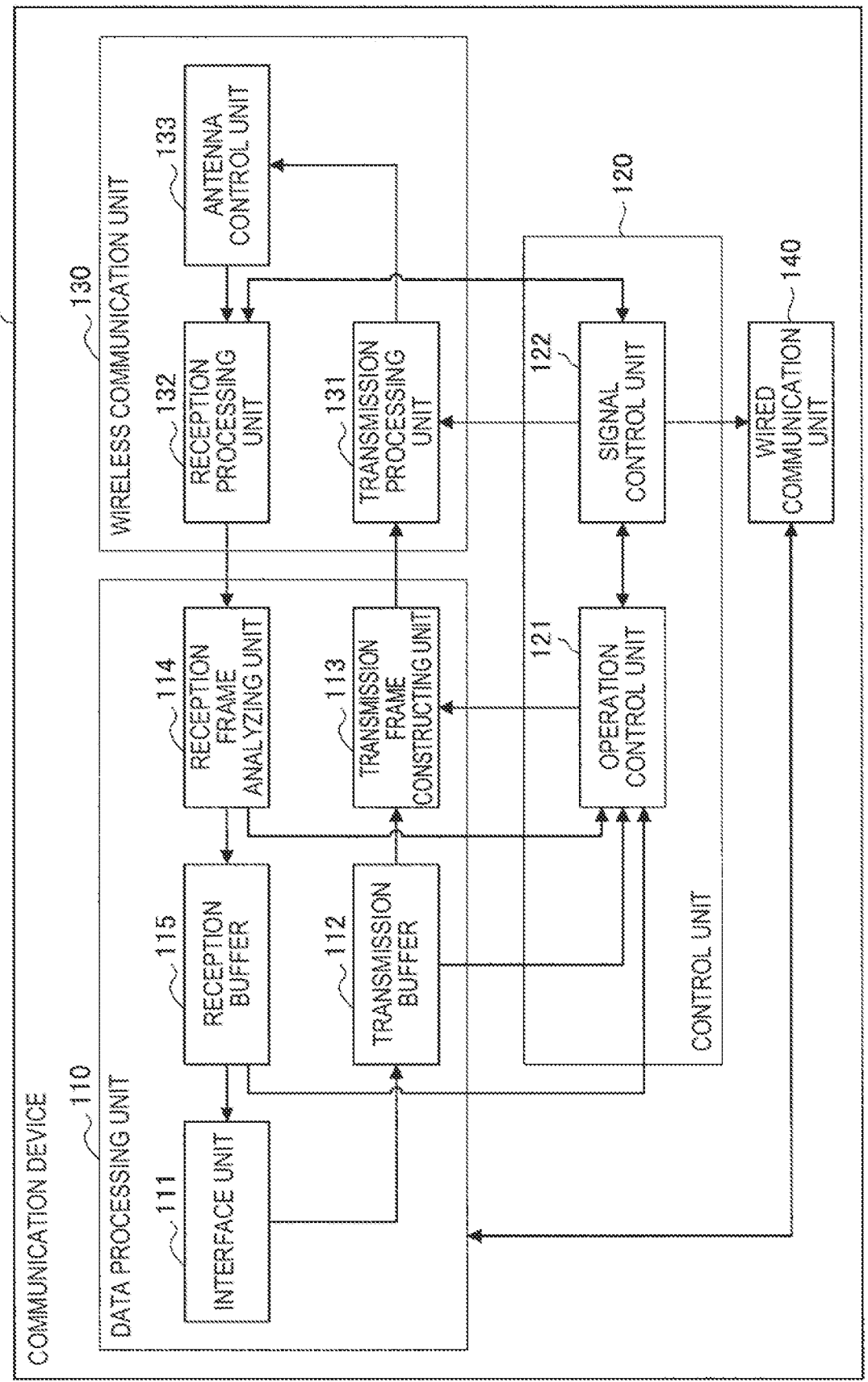
FIG. 3 is a block diagram illustrating an example of a schematic functional configuration of a communication device according to an embodiment of the present disclosure.

FIG. 3 is a block diagram illustrating an example of a schematic functional configuration of the communication device 100 according to an embodiment of the present disclosure.

The communication device 100 includes a data processing unit 110, a control unit 120, a wireless communication unit 130, and a wired communication unit 140 as illustrated in FIG. 3. The communication device 100 uses, for example, a wireless local area network (LAN) as wireless communication. In addition, the communication device 100 uses, for example, communication of the method of Ethernet (registered trademark) or a Universal Serial Bus (USB) for wired communication.

(Data Processing Unit)

The data processing unit 110 includes an interface unit 111, a transmission buffer 112, a transmission frame constructing unit 113, a reception frame analyzing unit 114, and a reception buffer 115 as illustrated in FIG. 3.

The interface unit 111 is an interface connected to another functional configuration included in the communication device 100. Specifically, the interface unit 111 receives data desired to be transferred from the other functional configuration, for example, an object application or a user interface, provides received data to the object application or the user interface, or the like.

The transmission buffer 112 stores data to be transmitted. Specifically, the transmission buffer 112 stores data obtained by the interface unit 111.

The transmission frame constructing unit 113 generates a frame to be transmitted. Specifically, the transmission frame constructing unit 113 generates a frame on the basis of data stored in the transmission buffer 112 or control information set by the control unit 120. For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114.

(Control Unit)

The control unit 120 operates as part of a processing unit, a transmission unit, and a reception unit, and includes an operation control unit 121 and a signal control unit 122 as illustrated in FIG. 3.

The operation control unit 121 controls an operation of the data processing unit 110. Specifically, the operation control unit 121 controls the occurrence of communication. For example, if a communication connection request occurs, the operation control unit 121 causes the data processing unit 110 to generate frames related to a connection process or an authentication processing such as an association process or an authentication process.

Further, the operation control unit 121 controls generation of frames on the basis of a storage state of data in the transmission buffer 112, an analysis result for a reception frame, or the like. For example, in a case in which data is stored in the transmission buffer 112, the operation control unit 121 instructs the transmission frame constructing unit 113 to generate a data frame in which the data is stored. Further, in a case in which reception of a frame is confirmed by the reception frame analyzing unit 114, the operation control unit 121 instructs the transmission frame constructing unit 113 to generate an acknowledgment frame which is a response to a received frame.

The signal control unit 122 controls an operation of the wireless communication unit 130. Specifically, the signal control unit 122 controls a transmission/reception process of the wireless communication unit 130. For example, the signal control unit 122 causes the wireless communication unit 130 to set a parameter for transmission and reception on the basis of an instruction from the operation control unit 121.

In addition, the signal control unit 122 controls a vacant channel detection process such as the above-described CSMA/CA. For example, the signal control unit 122 decides starting of transmission or waiting for transmission of a signal on the basis of a result of a reception process of the wireless communication unit 130.

(Wireless Communication Unit)

The wireless communication unit 130 operates as part of the transmission unit and the reception unit, and includes a transmission processing unit 131, a reception processing unit 132 and an antenna control unit 133 as illustrated in FIG. 3.

The transmission processing unit 131 performs a transmission process of frames provided from the transmission frame constructing unit 113. Specifically, the transmission processing unit 131 generates a signal to be transmitted on the basis of a frame provided from the transmission frame constructing unit 113 and parameters set by an instruction from the signal control unit 122. For example, the transmission processing unit 131 generates a symbol stream by performing encoding, interleaving, and modulation on the frame provided from the data processing unit 110 in accordance with a coding and modulation method instructed by the control unit 120. Further, the transmission processing unit 131 converts the signal related to the symbol stream obtained by the process at the previous stage into an analog signal, and performs amplification, filtering, and frequency up-conversion on the resulting signal.

The reception processing unit 132 performs a frame reception process on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained by the process at the previous stage and provides the acquired frame to the data processing unit 110 or the control unit 120.

The antenna control unit 133 controls transmission and reception of signals via at least one antenna. Specifically, the antenna control unit 133 transmits the signal generated by the transmission processing unit 131 via the antenna and provides the signal received via the antenna to the reception processing unit 132.

(Wired Communication Unit)

The wired communication unit 140 communicates with an external communication device using a wired communication method. Specifically, the wired communication unit 140 converts data provided from the data processing unit 110 into a signal of the wired communication method and transmits the signal. In addition, the wired communication unit 140 acquires data by decoding a received signal. Then, the acquired data is provided to a communication upper layer via the data processing unit 110.

1.3. Function of Device

Next, functions of the communication devices 100 will be described. As main functions of the communication devices 100, there are an object formation function, a communication function based on a communication role, an object maintenance function, and a docking function. Each of the functions will be described separately below. Note that a communication device 100 that operates as a manager of an object will also be referred to as an owner device, and the communication devices 100 other than the manager of the object will also be referred to as member devices below.

(Object Formation Function)

Figure 4:
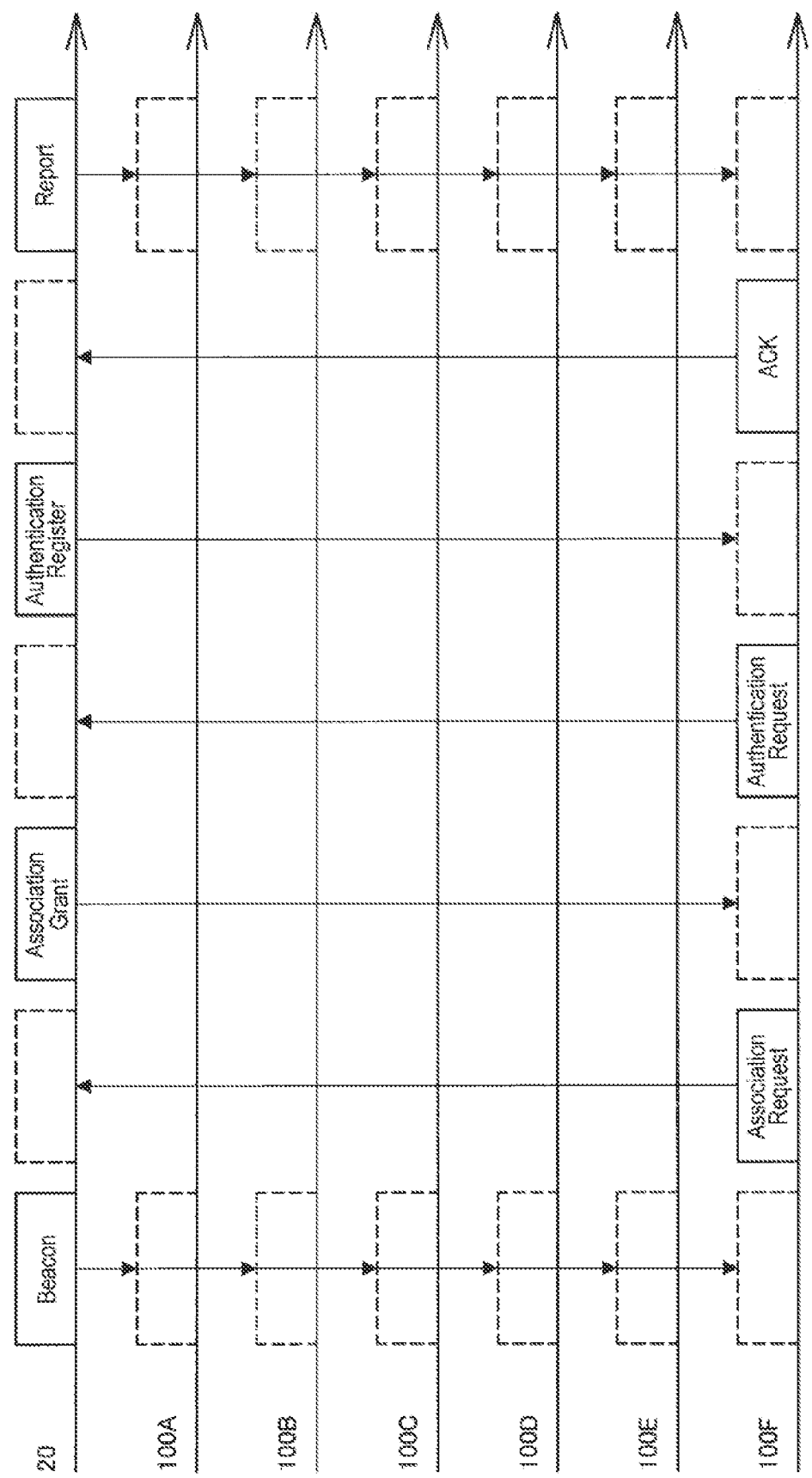
FIG. 4 is a frame sequence for describing an object formation function of a communication device according to an embodiment of the present disclosure.

The communication devices 100 form an object using communication. Specifically, the owner device initializes the framework of the object, and the member devices participate in the set object. At the time of the participation in the object, the communication role of each of the communication devices 100 is registered and shared. The object formation function will be described in detail with reference to FIG. 4. FIG. 4 is a frame sequence for describing the object formation function of the communication devices 100 according to an embodiment of the present disclosure. Note that, in the example of FIG. 4, the AP 20 is included in the constituent elements of an object as a communication device 100, and the AP 20 operates as the owner device.

First, the owner device transmits a frame to report the presence of the framework of the object (which will also be referred to as an object report frame below). For example, the control unit 120 causes the data processing unit 110 to periodically generate a beacon in which information regarding the object (which will also be referred to as object information below) is stored as an object report frame. The object information includes an object ID (identifier) by which the object is identified. Then, the wireless communication unit 130 transmits the generated beacon. Note that the object ID may be a framework identified by a Basic Service Set ID (BSSID).

A member device that has received the object report frame transmits a frame relating to a participation request to the object (which will also be referred to as a participation request frame below) in which information for specifying a communication role with respect to the object (which will also be referred to as role information below) is stored to the owner device. For example, the control unit 120 determines a communication role of the member device itself with respect to the object relating to the object ID stored in the beacon, and causes the data processing unit 110 to generate an association request frame as a participation request frame in which the role information relating to the determined communication role is stored. Then, the wireless communication unit 130 transmits the generated association request frame.

In a case in which the owner device that has received the participation request frame permits participation, the owner device registers the member device that is the transmission source of the participation request frame with the communication role with respect to the object. Then, the owner device transmits a participation response frame in which role information of a member device whose participation has already been completed is stored to the member device as a response to the participation request frame. For example, the control unit 120 determines whether to permit participation of the member device that is the transmission source of the received association request frame to the object. In a case in which it is determined to permit participation, the control unit 120 registers the role information stored in the association request frame for the object in which the device is participating. In addition, the control unit 120 acquires role information of another member device that has already been registered for the object in which the device is participating. Then, the control unit 120 causes the data processing unit 110 to generate an association grant frame indicating participation permission in which the acquired role information is stored as a participation response frame. The wireless communication unit 130 transmits the generated association grant frame.

The member device that has received the participation response frame registers the communication role with respect to the object relating to the participation request. For example, upon receiving the association grant frame, the control unit 120 registers the communication role of the own device for the object in which the device is participating and registers the communication role of the other member device included in the association grant frame.

Then, after the frame exchange relating to authentication is performed, the owner device transmits a frame to report participation in the object (which will also be referred to as a participation report frame below) to the member devices that have already completed participation in the object. For example, after the exchange of the association request frame and the association grant frame (which will also be referred to as an association process below), an exchange of an authentication request frame and an authentication register frame (which will also be referred to as an authentication process below) is performed. Then, after the authentication process, the control unit 120 causes the data processing unit 110 to generate a report frame as a participation report frame in which the role information of a communication device 100 that has participated in the object with its communication role additionally registered (which will also be referred to as registered role information) is stored. Then, the wireless communication unit 130 transmits the generated report frame.

The member device that has received the report frame registers the registered role information. For example, the control unit 120 updates the role information for the object in which the member device has participated on the basis of the registered role information stored in the received report frame.

Note that, although the example in which the association request frame is a participation request frame and the permission frame is a participation response frame has been described above, the authentication request frame may be a participation request frame and the authentication register frame may be a participation response frame. In addition, although the example in which the participation request frame is transmitted on the basis of the report frame has been described above, the member device may transmit the participation request frame on the basis of an input of a user or an instruction from an application. Furthermore, the owner device having object information may present the object information to the user or the application.

(Communication Function Based on Communication Role)

Figure 5:
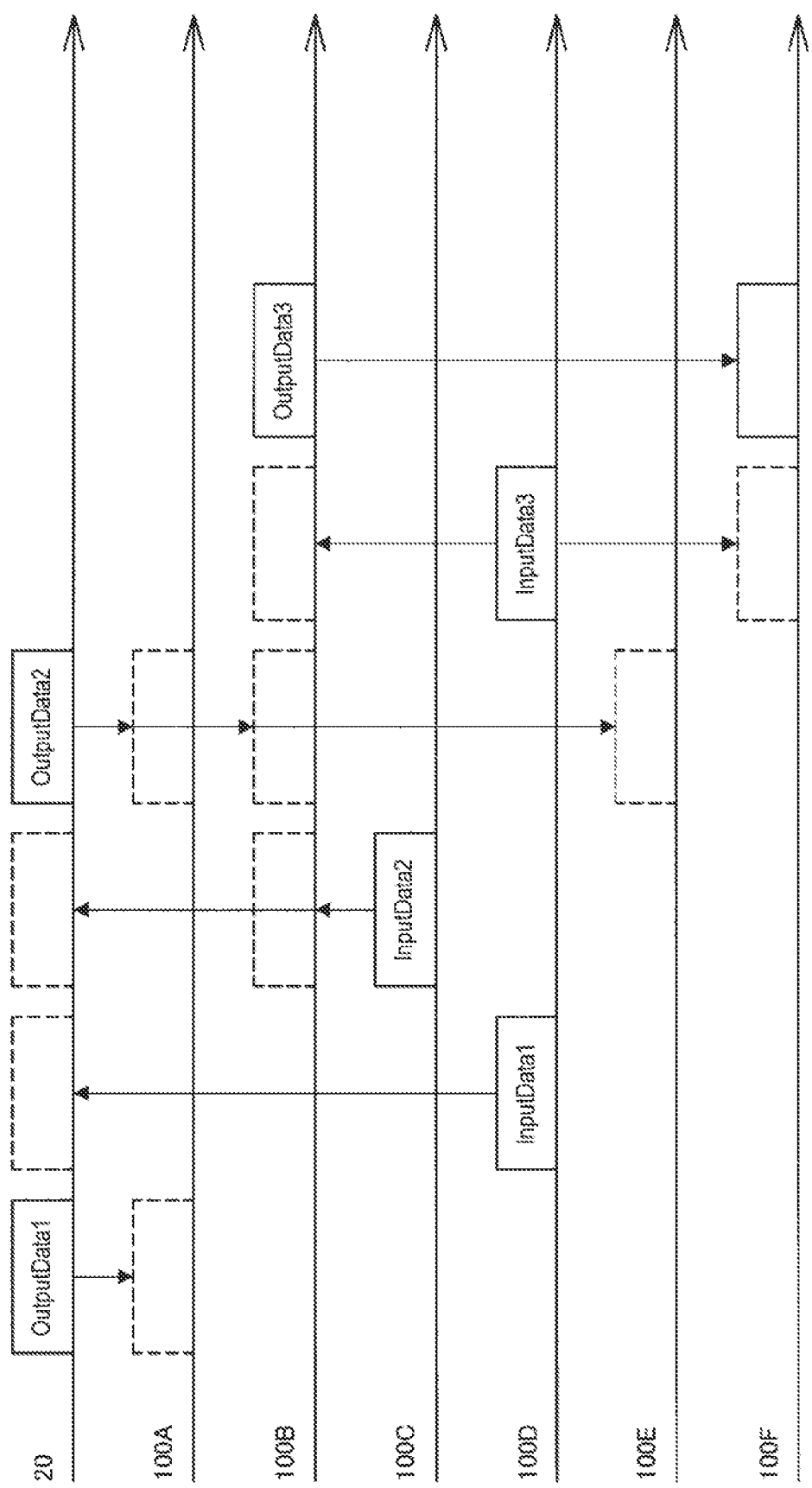
FIG. 5 is a frame sequence for describing an example of communication based on a communication role of a communication device according to an embodiment of the present disclosure.

The communication devices 100 perform communication on the basis of a communication role registered for the object in which the devices have participated. The communication role is at least one of transmission or reception. Communication based on a communication role will be described in detail with reference to FIG. 5. FIG. 5 is a frame sequence for describing an example of communication based on communication roles of the communication devices 100 according to an embodiment of the present disclosure.

The communication devices 100 whose communication roles are reception receive a frame transmitted from a communication device outside an object. For example, the communication device 100A that is a display receives output data 1 that is image data from the AP 20 outside the object. In addition, the communication device 100A, 100B that is a memory, and 100E that is a speaker receive output data 2 that is video data from the AP 20 outside the object.

Here, the communication role may further be communication of data for specific use or of a specific type. For example, in a case in which the communication role of the communication device 100A that is a display is reception of image data and the output data 1 is image data, the communication device 100A completes a reception process. On the other hand, in a case in which the output data 1 is not image data (e.g., audio data), the communication device 100A stops the reception process. In addition, in a case where main image data (e.g., television video) and sub-image data (e.g., television program table) are provided to the object, the communication device 100A that is a display receives and displays the main image data, and the communication device 100F that is a smartphone receives and displays the sub-image data. In addition, in a case in which audio data for each output direction is provided to the object, a communication device 100 that is a left speaker receives the audio data for left direction output and outputs sound, and a communication device 100 that is a right speaker receives the audio data for right direction output and outputs sound.

The communication devices 100 whose communication roles are transmission transmit a frame to a communication device outside the object. For example, the communication device 100D that is a mouse transmits input data 1 that is mouse operation information to the AP 20 outside the object. In addition, the communication device 100C that is a keyboard transmits input data 2 that is keyboard input information to the AP 20 outside the object.

In addition, wireless communication may be used in communication with the communication devices 100 inside the object. Specifically, a communication device 100 whose communication role is transmission transmits a frame to another communication device 100 inside the object. On the other hand, a communication device 100 whose communication role is reception receives a frame transmitted from another communication device 100 inside the object. For example, the communication device 100D that is a mouse transmits mouse operation information to the communication device 100B that is a memory and the communication device 100F that is a smartphone. Then, video data or the like stored in the communication device 100B is transmitted from the communication device 100B to 100F on the basis of the mouse operation information. Note that both transmission and reception may be communication roles, like the communication device 100B.

(Object Maintenance Function)

Figure 6:
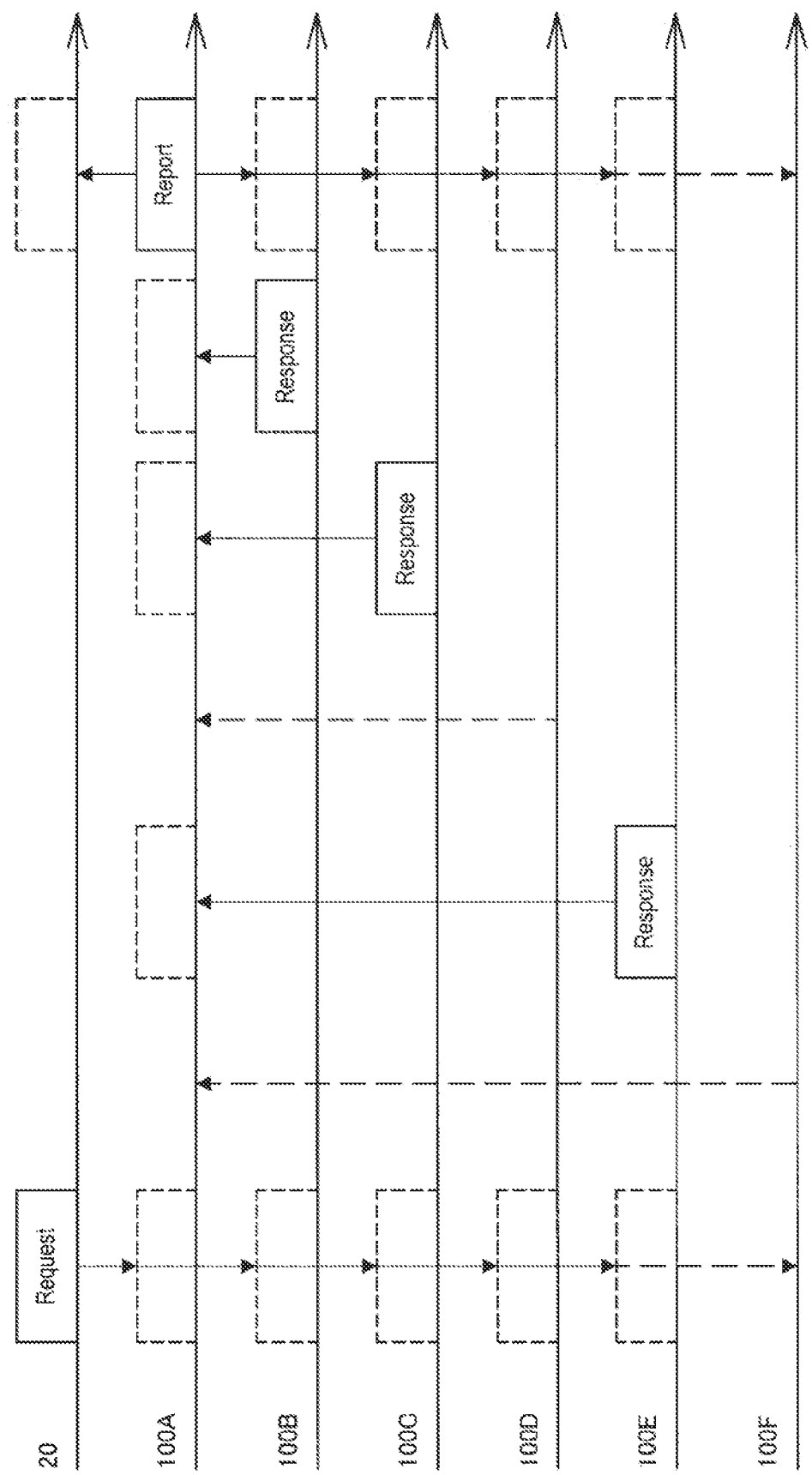
FIG. 6 is a frame sequence for describing an object maintenance function of a communication device according to an embodiment of the present disclosure.

A communication device 100 maintains the formed object. Specifically, the communication device 100 periodically updates role information with respect to the formed object. For example, the owner device transmits a request frame for maintaining the object (which will also be referred to as a maintenance request frame below) to the member devices participating in the object. The member devices transmit a frame as a response to the maintenance request frame (which will also be referred to as a maintenance response frame below). The maintenance response frame stores role information. The object maintenance function will be described in detail with reference to FIG. 6. FIG. 6 is a frame sequence for describing the object maintenance function of the communication device 100 according to an embodiment of the present disclosure. Note that, in the example of FIG. 6, the communication device 100A operates as an owner device together with the AP 20.

The owner device or the AP 20 periodically transmits a maintenance request frame to the member devices. For example, when a transmission time of a request frame for checking the presence of the communication devices 100, which may also be a maintenance request frame, comes, the control unit 120 causes the data processing unit 110 to generate a request frame in which information such as an object ID is stored. Then, the wireless communication unit 130 transmits the generated request frame. Note that the request frame may be a periodically transmitted signal such as a beacon, and the information stored in the request frame may be stored in the signal.

The member devices that have received the maintenance request frame transmit maintenance response frames in which role information stored in the own devices is stored to the owner device at predetermined transmission times. For example, the control unit 120 thereof acquires role information registered in accordance with the object ID stored in the received request frame. Next, the control unit 120 causes the data processing unit 110 to generate a response frame for indicating the presence of the communication devices 100, which may also be a maintenance response frame in which the acquired role information is stored. Then, the wireless communication unit 130 transmits the generated response frame.

Then, the owner device transmits a maintenance report frame in which updated role information is stored to the member devices on the basis of the reception of the maintenance response frame. For example, the control unit 120 thereof updates the registered role information stored in the own device on the basis of the role information stored in the received response frame. In more detail, no response frames are received from the communication devices 100F and 100D among the member devices as illustrated in FIG. 6. For this reason, the control unit 120 completely or temporarily excludes transmission or reception from the communication roles of the communication devices 100F and 100D. Next, the control unit 120 causes the data processing unit 110 to generate a report frame serving as a maintenance report frame in which the updated registered role information is stored. Then, the wireless communication unit 130 transmits the generated report frame. Note that it is difficult to determine whether the reason for there being no response frames received from the communication devices 100F and 100D is an incompetent transmission function or reception function or that the communication devices are not in a communication range. Thus, in this case, the role information may be updated uniformly.

The member devices that have received the report frame register the registered role information. For example, the control unit 120 thereof updates the role information with respect to the object in which the devices are participating on the basis of the registered role information stored in the received report frame.

Note that, although the example in which the owner device transmits a maintenance request frame and a maintenance report frame has been described above, the member devices may transmit these frames.

(Docking Function)

A communication device 100 is physically connected to another communication device 100. For example, the communication devices 100 are connected to each other via a terminal, a communication wire, or the like as illustrated in FIG. 2. Such a physical connection will also be referred to as docking below.

Figure 7:
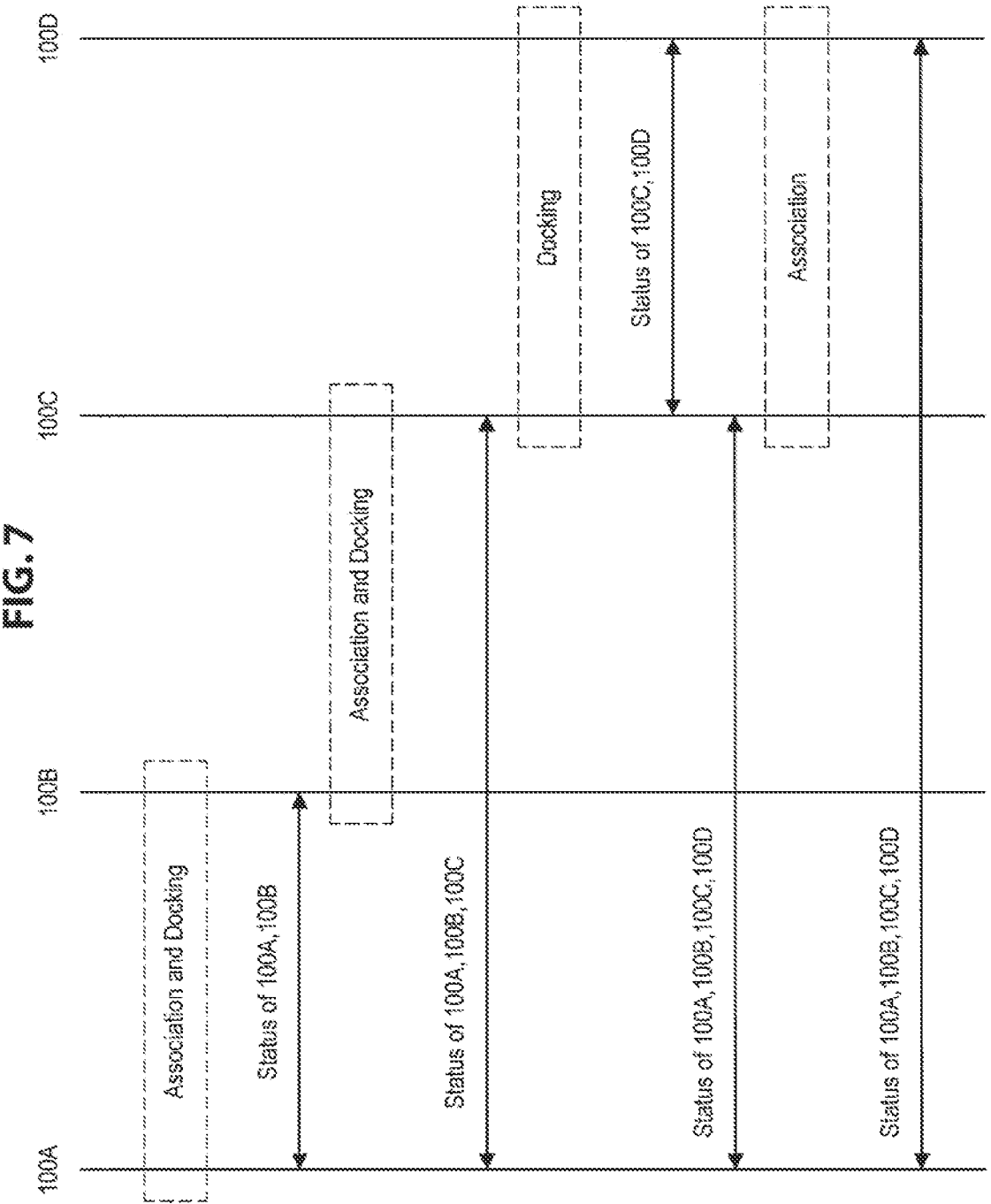
FIG. 7 is a sequence diagram for describing a flow of communication accompanying docking by communication devices according to an embodiment of the present disclosure.

In addition, communication between the communication devices 100 participating in the object may be performed using a communication method accompanying docking. This communication method is different from a communication method to be used in communication with a communication device outside the object. Communication accompanying docking will be described in detail with reference to FIG. 7. FIG. 7 is a sequence diagram for describing a flow of communication accompanying docking by the communication devices according to an embodiment of the present disclosure.

When docking and association processes are performed, a communication device 100 shares status information of a communication device 100 being docked. For example, when the communication devices 100A and 100B dock with each other in a state in which the association process has been executed (i.e., a state in which the devices have participated in the object), the communication device 100A and 100B each communicate a status information signal as a status information signal thereof. Then, status information shared via communication is registered in each of the communication devices 100A and 100B. Likewise, when the communication device 100C that has completed the association process docks with the communication device 100B additionally, the status information signal of the communication devices 100A and 100B is transmitted from the communication device 100B, and a status information signal of the communication device 100C is transmitted from the communication device 100C. As a result, status information is shared between the communication devices 100A to 100C.

In addition, in a case in which the association process has not yet been executed at the time at which docking is performed, only status information of the communication devices 100 that have directly docked with each other is shared by the communication devices 100 that have directly docked with each other. For example, when the communication device 100D that has not executed the association process docks with the communication device 100C, the communication device 100C and the communication device 100D share status information of the communication devices 100C and 100D. In this stage, status information of the communication devices 100A and 100B is not provided to the communication device 100D.

On the other hand, the communication devices 100 that have executed the association process share status information of all docked communication devices 100 including status information of the communication devices 100 that have not executed the association process. For example, the communication device 100C sharing the status information of the communication device 100D transmits a status information signal of the communication device 100D to the docked communication devices 100A and 100B. Accordingly, the communication devices 100A to 100C share the status information of the communication devices 100A to 100D.

Then, when the association process is executed, the status information of all communication devices 100 is shared by all the docked communication devices 100. For example, when the association process is executed by the communication device 100D for the object in which the communication devices 100A to 100C are participating, the status information is shared between the communication devices 100A to 100D.

(Configuration of Communicated Signal)

The functions of the communication devices 100 have been described above. Next, a configuration of a signal used in communication for each function will be described.

Figure 8:
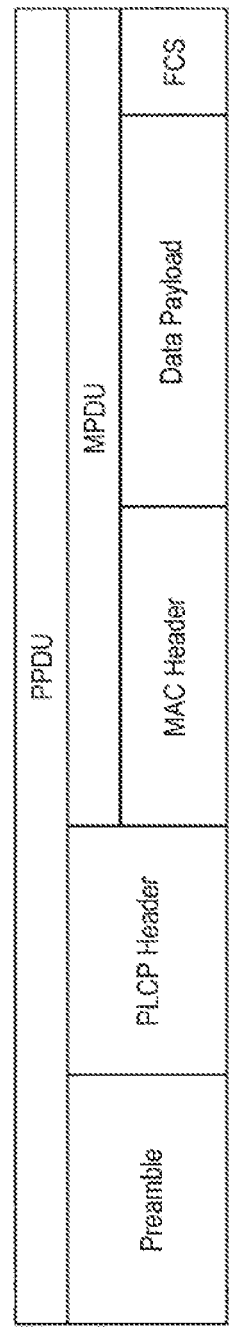
FIG. 8 is a diagram illustrating an example of a configuration of a first frame communicated by a communication device according to an embodiment of the present disclosure.

First, a configuration of a first frame in which role information is stored will be described. The first frame includes a participation request frame, a participation response frame, a participation report frame, a maintenance response frame, and a maintenance report frame as described above. The first frame is, for example, a physical layer convergence protocol (PLCP) protocol data unit (PDU). A configuration of the first frame will be described with reference to FIG. 8. FIG. 8 is a diagram illustrating an example of a configuration of the first frame communicated by a communication device 100 according to an embodiment of the present disclosure.

The first frame is a PPDU having a preamble, a PLCP header, and an MPDU as illustrated in FIG. 8. The MPDU has an MAC header, a data payload, and a frame check sequence (FCS). The above-described role information is stored in, for example, the data payload as an information element. A configuration of an information element in which role information is stored (which will also be referred to as a role information element) will be described with reference to FIG. 9. FIG. 9 is a diagram illustrating an example of a configuration of a role information element communicated by a communication device 100 according to an embodiment of the present disclosure.

The role information element has fields of element ID, length, object ID, function code, attribute, capability, category, and the like as illustrated in FIG. 9. The element ID field stores information for specifying an information element, and the length field stores information indicating a length of information stored in the information element. The object ID field stores information for specifying an object (object ID), and the function code stores role information. The attribute field stores attribute information of the communication device 100, and the capability field stores information indicating performance of the communication device 100. In addition, the category field stores information indicating the category of information handled by the communication device 100. For example, the role information stored in the function code is code information corresponding to a communication role. Note that the role information may be information to be used to infer the communication role. The role information may be, for example, information indicating an attribute or performance of the communication device 100 stored in the attribute or capability as illustrated in FIG. 9, or the like, and the communication role may be inferred from the information.

Next, a configuration of a status information signal relating to a communication role of a communication device 100 will be described. As described above, a status information signal is communicated at the time of docking. A configuration of a status information signal will be described with reference to FIG. 10. FIG. 10 is a diagram illustrating an example of a configuration of a status information signal according to an embodiment of the present disclosure.

The status information signal has a header a payload, and cyclic redundancy check (CRC) as illustrated in FIG. 10. The header has fields of source address in which transmission source information of the status information signal is stored and destination address in which destination information of the status information signal is stored. The payload has fields of protocol version, object ID, function code, operation status, and status code. The protocol version field stores information indicating the version of the protocol to be used in communication of the status information signal, and the object ID field stores an object ID. The function code field stores role information, and the operation status field stores information indicating an operation status of the communication device 100. In addition, the status code field stores status information relating to the communication role of the communication device 100. The status information includes information indicating a status of occurrence of a communication error of the communication device 100, an incompetent communication function, and the like.

Note that, in a case in which the format of the status information signal is a frame format like the above-described PPDU, the status information signal may be communicated as the first frame. In addition, the role information may be shared in a different signal from the status information signal. In addition, the status information may be stored as object management information which will be described below.

(Configuration of Information to be Registered)

Next, a configuration of information regarding an object to be registered for the communication devices 100 will be described with reference to FIG. 11. FIG. 11 is a diagram illustrating an example of a configuration of object management information to be registered for the communication devices 100 according to an embodiment of the present disclosure.

The object management information is registered and managed in units of objects. As illustrated in FIG. 11, the object management information has fields of object ID, object attribute, number of devices, and device information. The object ID field stores an object ID of the object in which the communication devices 100 themselves are participating and the object attribute field stores attribute information of the object. The number of devices field stores information indicating the number of communication devices 100 participating in the object, and the device information fields store individual information of the communication devices 100 participating in the object. The individual information includes an MAC address and role information. The device information fields are actively added or deleted in accordance with the number of participating communication devices 100.

Note that the above-described registered role information corresponds to role information being registered as object management information.

1.4. Process of Device

Next, a process of a communication device 100 will be described with respect to each function.

(Object Setting Process)

Figure 12:
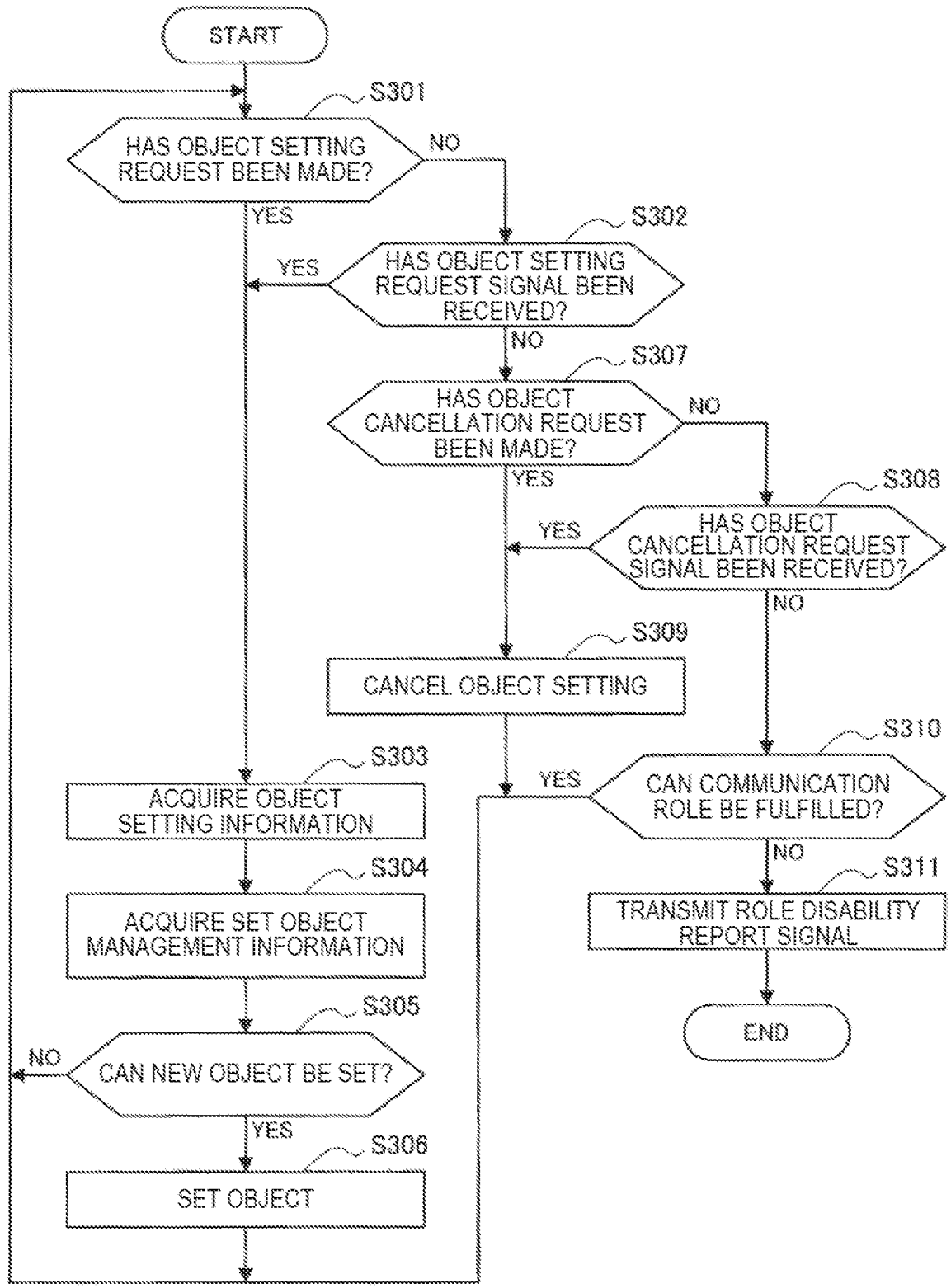
FIG. 12 is a flowchart conceptually illustrating an example of an object setting process of a communication device according to an embodiment of the present disclosure.

First, an object setting process by the object formation function will be described with reference to FIG. 12. FIG. 12 is a flowchart conceptually illustrating an example of the object setting process of a communication device 100 according to an embodiment of the present disclosure.

The communication device 100 determines whether an object setting request has been made (Step S301). Specifically, the control unit 120 determines whether information regarding a setting instruction operation for an object by a user or an object setting instruction from an application being activated in the communication device 100 has been obtained via the interface unit 111. Note that a communication role may be decided or a communication role decided in advance on the basis of performance of the communication device 100 may be selected with the setting instruction operation.

When it is determined that no object setting request has been made (No in Step S301), the communication device 100 determines whether an object setting request signal has been received (Step S302). Specifically, the control unit 120 determines whether an object setting request signal from another communication device 100 connected for communication has been received. The object setting request signal is generated on the basis of, for example, information input by the user obtained via the interface unit 111 or an instruction from an application. Note that the communication device 100 may transmit an object setting request signal on the basis of a user input.

In a case in which it is determined that an object setting request has been made (YES in Step S301) or it is determined that an object setting request signal has been received (YES in Step S302), the communication device 100 acquires object setting information (Step S303). Specifically, the control unit 120 acquires information including an object ID, an object attribute, a required communication role, and the like for the object relating to the setting request.

Next, the communication device 100 acquires set object management information (Step S304). Specifically, the control unit 120 acquires information such as an object ID of the object that has already been set. In addition, the control unit 120 acquires attribute information or performance information of the communication device 100.

Next, the communication device 100 determines whether a new object can be set (Step S305). Specifically, the control unit 120 determines whether an object for a set request has been set, whether the number of objects has not reached a setting upper limit, or the like. In addition, the control unit 120 determines whether the device can take on the communication role required by the attribute information or performance information of the communication device 100.

When it is determined that a new object can be set (Yes in Step S305), the communication device 100 sets an object (Step S306). Specifically, the control unit 120 registers object management information thereof on the basis of the acquired object setting information.

On the other hand, in a case in which it is determined that no object setting request signal has been received (NO in Step S302), the communication device 100 determines whether an object cancellation request has been made (Step S307). Specifically, the control unit 120 determines whether information regarding a setting cancellation instruction operation for an object by the user or an object setting cancellation instruction from an application being activated in the communication device 100 has been obtained via the interface unit 111.

When it is determined that no object cancellation request has been made (NO in Step S307), the communication device 100 determines whether an object cancellation request signal has been received (Step S308). Specifically, the control unit 120 determines whether an object cancellation request signal has been received from another communication device 100 participating in the object in which the communication device 100 is participating. The object cancellation request signal may be generated and transmitted on the basis of, for example, user input information obtained via the interface unit 111 or an instruction from an application by another communication device 100.

In a case in which it is determined that an object cancellation request has been made (YES in Step S307) or it is determined that an object cancellation request signal has been received (YES in Step S308), the communication device 100 cancels the object setting (Step S309). Specifically, the control unit 120 deletes object management information relating to the cancellation request.

In a case in which it is determined that no object cancellation request signal has been received (NO in Step S308), the communication device 100 determines whether the communication role can be fulfilled (Step S310). Specifically, the control unit 120 determines whether the function of taking on the communication role (e.g., transmission, reception, or the like) for the set object is normally working.

When it is determined that it is difficult to fulfill the communication role (NO in Step S310), the communication device 100 transmits a role disability report (Step S311). Specifically, when a defect is detected in the communication device 100, the control unit 120 reports a role disability report signal indicating that it is difficult to fulfill the communication role for the object to another communication device 100 via the wireless communication unit 130 or the wired communication unit 140 with respect to the object for which the communication role relating to the function with the occurring defect has been set.

(Object Participation Response Process)

Figure 13:
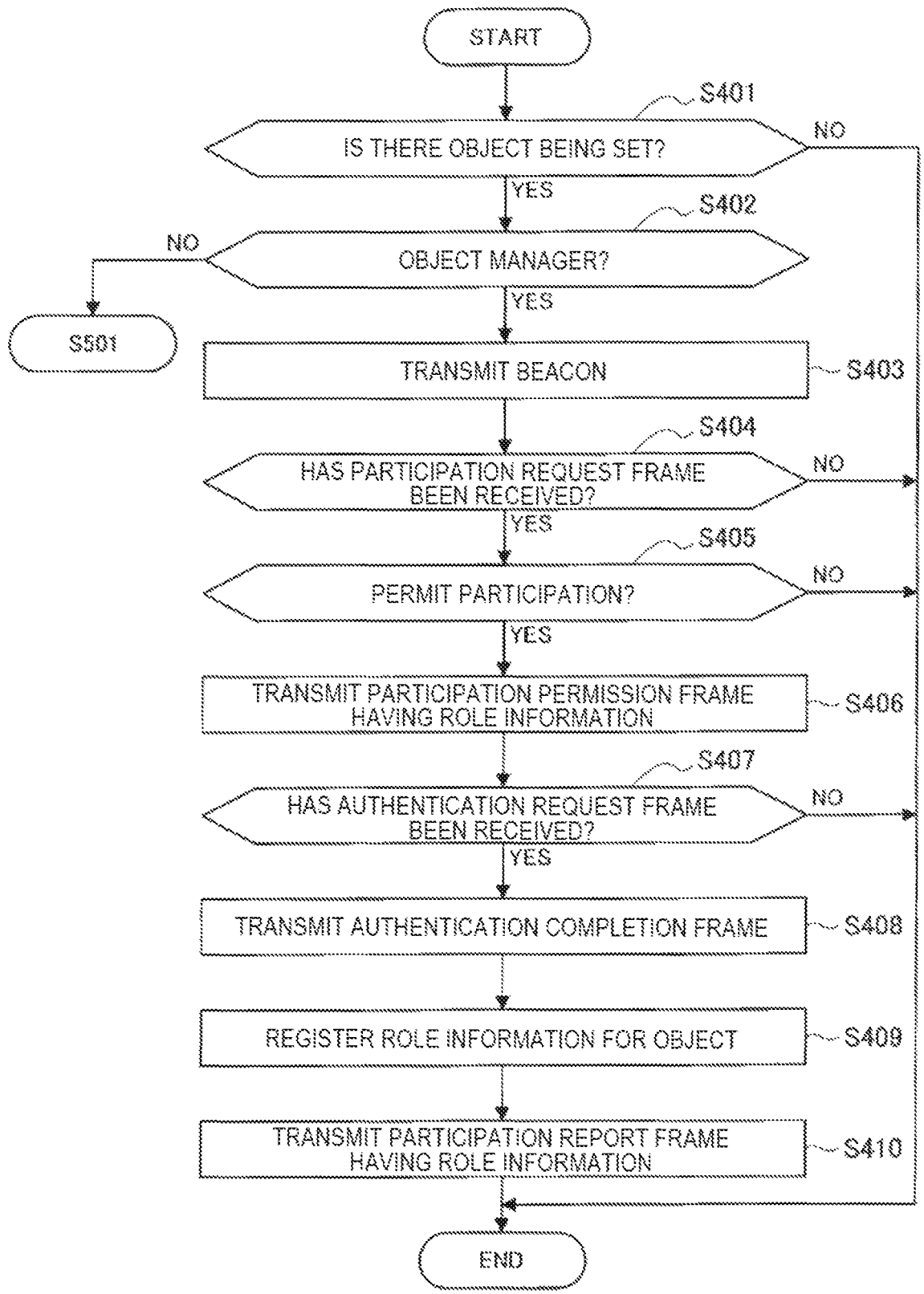
FIG. 13 is a flowchart conceptually illustrating an example of an object participation response process of a communication device according to an embodiment of the present disclosure.

Next, an object participation response process by the object formation function will be described with reference to FIG. 13. FIG. 13 is a flowchart conceptually illustrating an example of an object participation response process of the communication device 100 according to an embodiment of the present disclosure. Note that, although an example in which, in a case in which the communication device 100 is an owner device that manages the object, the owner device operates as an access point and transmits a predetermined beacon is introduced in FIG. 13, the embodiment is not limited to the example. For example, the owner device may operate as a station (STA) and transmit a specific broadcast frame in which object information is stored or the like, instead of a beacon.

The communication device 100 determines whether there is an object being set (Step S401). Specifically, the control unit 120 determines whether there is an object of which object management information has been registered.

When it is determined that there is an object being set (YES in Step S401), the communication device 100 determines whether the device itself is the object manager (Step S402). Specifically, the control unit 120 determines whether the communication device 100 itself is the owner device of the object being set. Note that, in a case in which the communication device 100 is not the owner device, the process proceeds to Step S501 which will be described below.

When it is determined that the communication device itself is the object manager (YES in Step S402), the communication device 100 transmits a beacon (Step S403). Specifically, the control unit 120 causes the data processing unit 110 to generate a beacon having information of the object being set (e.g., an object ID). Then, the wireless communication unit 130 transmits the generated beacon.

Next, the communication device 100 determines whether a participation request frame has been received (Step S404). Specifically, the control unit 120 determines whether an association request frame having role information has been received from a member device.

When it is determined that a participation request frame has been received (YES in Step S404), the communication device 100 determines whether to permit participation (Step S405). Specifically, the control unit 120 determines whether to permit participation of the member device serving as the transmission source of the association request frame.

When it is determined to permit participating (YES in Step S405), the communication device 100 transmits a participation permission frame having role information (Step S406). Specifically, the control unit 120 causes the data processing unit 110 to generate an association grant frame having all role information of the communication device 100 participating in the object for which participation is permitted. Then, the wireless communication unit 130 transmits the generated association grant frame.

Next, the communication device 100 determines whether an authentication request frame has been received (Step S407). Specifically, the control unit 120 determines whether an authentication request frame of a member device with permitted participation has been received.

When it is determined that an authentication request frame has been received (YES in Step S407), the communication device 100 transmits an authentication completion frame (Step S408). Specifically, the control unit 120 causes the data processing unit 110 to generate an authentication register frame as a response to the authentication request frame. Then, the wireless communication unit 130 transmits the generated authentication register frame.

Next, the communication device 100 registers the role information for the object (Step S409). Specifically, the control unit 120 adds the role information obtained in the association process to the object management information.

Next, the communication device 100 transmits a participation report frame having the role information (Step S410). Specifically, the control unit 120 causes the data processing unit 110 to generate a report frame in which all role information corresponding to the updated object management information is stored. Then, the wireless communication unit 130 transmits the generated report frame.

(Object Participation Request Process)

Figure 14:
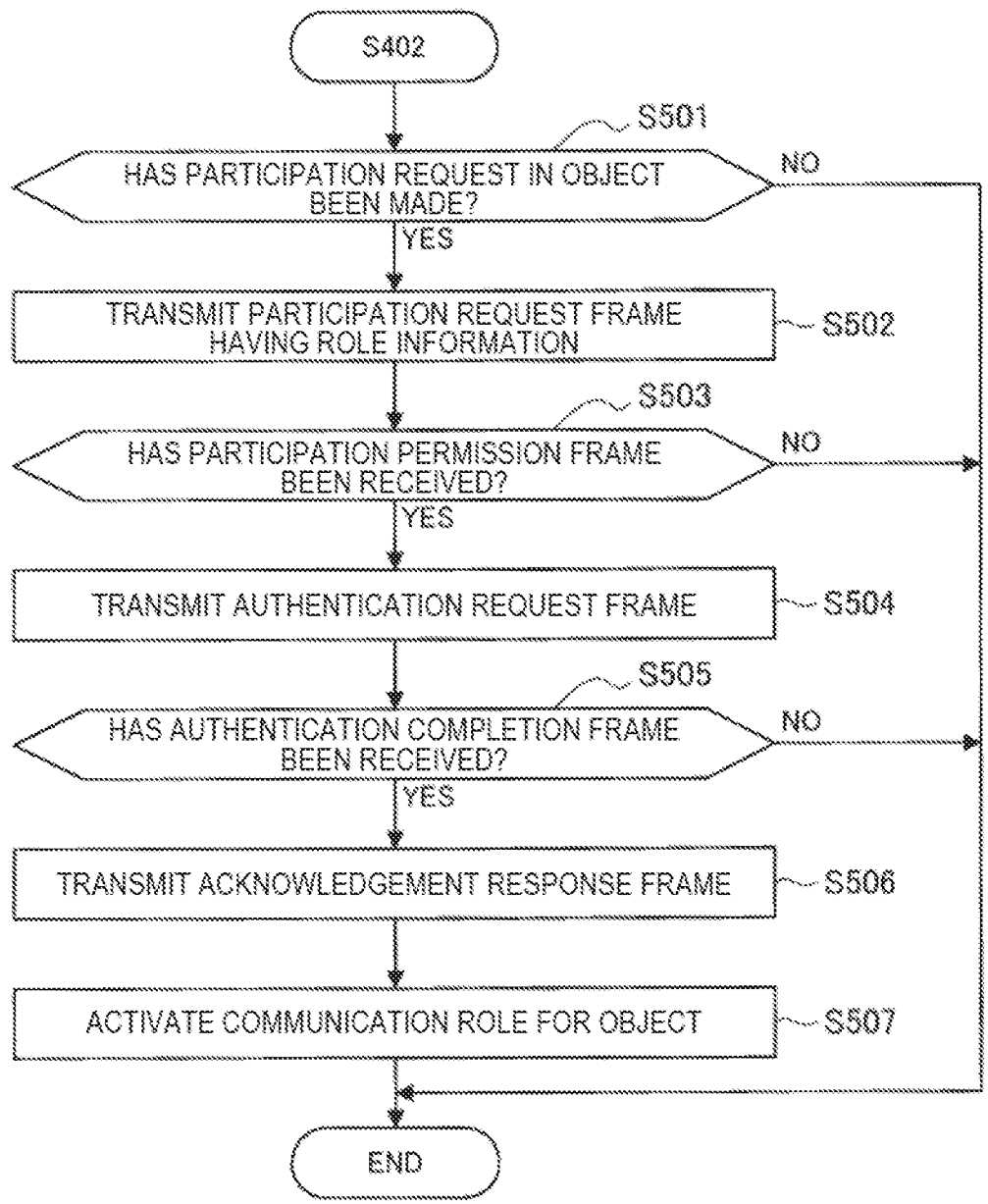
FIG. 14 is a flowchart conceptually illustrating an example of an object participation request process of a communication device according to an embodiment of the present disclosure.

Next, an object participation request process by the object formation function will be described with reference to FIG. 14. FIG. 14 is a flowchart conceptually illustrating an example of the object participation request process of the communication device 100 according to an embodiment of the present disclosure.

The communication device 100 determines whether a request for participation in the object has been made when it is determined that the communication device 100 is not the object manager in Step S402 described above (Step S501). Specifically, the control unit 120 determines whether a request for participation in the object has been reported from a communication upper layer.

When it is determined that a request for participation in the object has been made (YES in Step S501), the communication device 100 transmits a participation request frame having role information (Step S502). Specifically, the control unit 120 causes the data processing unit 110 to generate an association request frame in which role information already set for the object that is the participation destination is stored. Then, the wireless communication unit 130 transmits the generated association request frame.

Next, the communication device 100 determines whether a participation permission frame has been received (Step S503). Specifically the control unit 120 determines whether an association grant frame has been received as a response to the association request frame.

When it is determined that a participation permission frame has been received (YES in Step S503), the communication device 100 transmits an authentication request frame (Step S504). Specifically, the control unit 120 causes the data processing unit 110 to generate an authentication request frame. Then, the wireless communication unit 130 transmits the generated authentication request frame.

Next, the communication device 100 determines whether an authentication completion frame has been received (Step S505). Specifically, the control unit 120 determines whether an authentication register frame has been received.

When it is determined that an authentication completion frame has been received (YES in Step S505), the communication device 100 transmits an acknowledgement response frame (Step S506). Specifically, the control unit 120 transmits an acknowledgement (ACK) frame serving as an acknowledgement response to the authentication register frame.

Next, the communication device 100 activates the communication role for the object (Step S507). Specifically, the control unit 120 activates the communication role registered for the object in which participation has been permitted in the association process. For example, in a case in which the communication role of the communication device 100 having transmission and reception functions is transmission, the control unit 120 activates the transmission function and stops the reception function.

(Communication Process Based on Communication Role)

Figure 15:
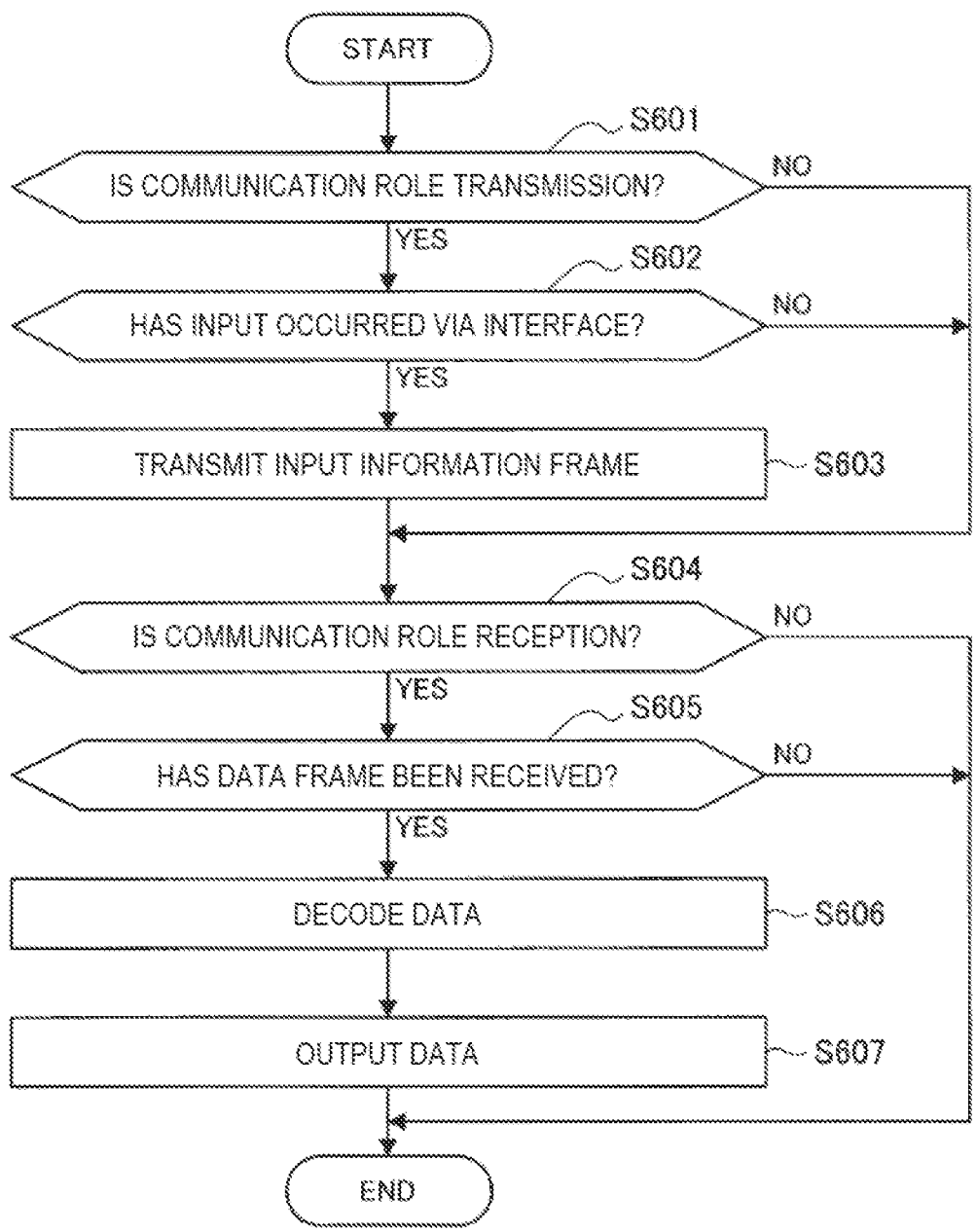
FIG. 15 is a flowchart conceptually illustrating an example of a communication process based on a communication role of a communication device according to an embodiment of the present disclosure.

Next, a process relating to a communication function based on a communication role will be described with reference to FIG. 15. FIG. 15 is a flowchart conceptually illustrating an example of a communication process based on a communication role of the communication device 100 according to an embodiment of the present disclosure.

The communication device 100 determines whether its communication role is transmission (Step S601). Specifically, the control unit 120 determines whether its communication role registered for the object being set is transmission.

When it is determined that its communication role is transmission (YES in Step S601), the communication device 100 determines whether an input has occurred via the interface (Step S602). Specifically, the control unit 120 determines whether input operation information of a user or input information from an application or a service has been provided via the interface unit 111.

When it is determined that an input has occurred via the interface (YES in Step S602), the communication device 100 transmits an input information frame (Step S603). Specifically, the control unit 120 determines transmission or non-transmission of the information obtained via the interface unit 111. When transmission of the information is determined, the control unit 120 causes the data processing unit 110 to generate an input information frame in which the information is stored. Then, the wireless communication unit 130 transmits the generated input information frame.

In addition, the communication device 100 determines whether its communication role is reception (Step S604). Specifically, the control unit 120 determines whether the communication role registered for the object being set is reception.

When it is determined that the communication role is reception (YES in Step S604), the communication device 100 determines whether a data frame has been received (Step S605). Specifically, the control unit 120 determines whether a data frame has been received from a communication device outside the object or another communication device 100 inside the object.

When it is determined that a data frame has been received (YES in Step S605), the communication device 100 decodes the data (Step S606). Specifically, the control unit 120 determines output or non-output of the received data frame. When it is determined to output the data frame, the data processing unit 110 decodes the data frame and retrieves the data.

Then, the communication device 100 outputs the data (Step S607). Specifically, the control unit 120 outputs the data retrieved from the data frame to an application or a service via the interface unit 111.

(Object Maintenance Process)

Figure 16:
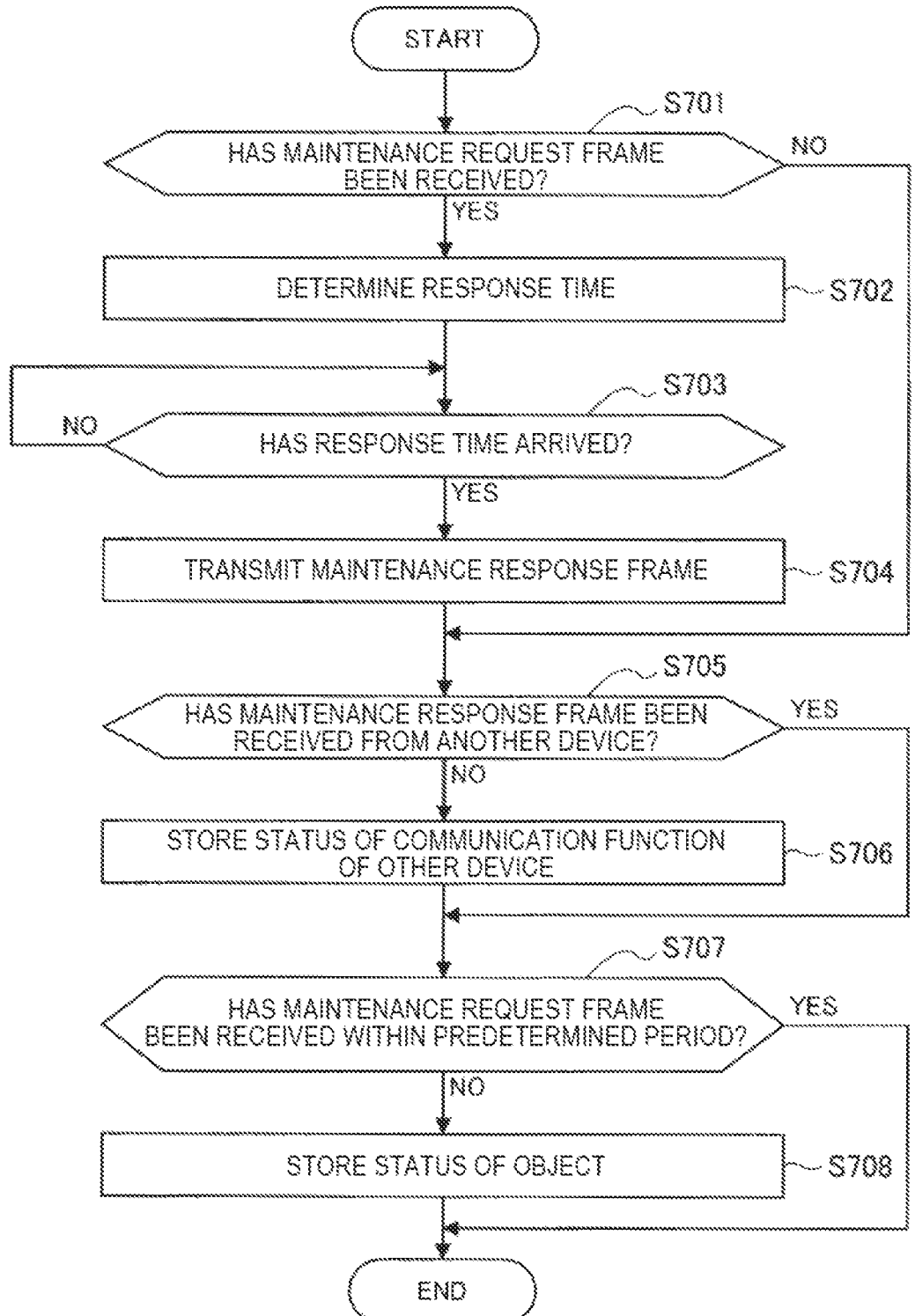
FIG. 16 is a flowchart conceptually illustrating an example of an object maintenance process of a communication device according to an embodiment of the present disclosure.

Next, a process relating to the object maintenance function will be described with reference to FIG. 16. FIG. 16 is a flowchart conceptually illustrating an example of an object maintenance process of the communication device 100 according to an embodiment of the present disclosure.

The communication device 100 determines whether a maintenance request frame has been received (Step S701). Specifically, the control unit 120 determines whether a request frame has been received from the owner device or a member device with respect to the object in which the communication device 100 is participating.

When it is determined that a maintenance request frame has been received (YES in Step S701), the communication device 100 determines a response time (Step S702). Specifically, the control unit 120 determines a transmission time of a response frame on the basis of the reception of the request frame.

Next, the communication device 100 determines whether the response time has arrived (Step S703). Specifically, the control unit 120 determines whether the determined transmission time has arrived.

When it is determined that the response time has arrived (YES in Step S703), the communication device 100 transmits a maintenance response frame (Step S704). Specifically, the control unit 120 causes the data processing unit 110 to generate a response frame in which registered role information is stored. Then, the wireless communication unit 130 transmits the generated response frame.

Next, the communication device 100 determines whether a maintenance response frame has been received from another device (Step S705). Specifically, the control unit 120 determines whether a response frame has been received from at least one of the other communication devices 100 participating in the objet.

When it is determined that a maintenance response frame has not been received from another device (NO in Step S705), the communication device 100 stores a status of a communication function of the other device (Step S706). Specifically, the control unit 120 determines that a transmission function or a reception function of the other communication device 100 present within the communication range is incompetent on the basis of the fact that a response frame that is supposed to be transmitted on the basis of the reception of the request frame has not been received. Then, the control unit 120 causes the fact that the communication function of the surrounding communication device 100 is incompetent to be stored in object management information, or the like.

In addition, the communication device 100 determines whether the maintenance request frame has been received within a predetermined period (Step S707). Specifically, the control unit 120 determined whether a response frame has been received before the predetermined period elapses after a previous response frame is received from the other communication device 100 (at least the owner device) participating in the object.

When it is determined that the maintenance request frame has not been received within a predetermined period (NO in Step S707), the communication device 100 stores the status of the object (Step S708). Specifically, in a case in which no request frame has not been received even after a period within which a request frame is supposed to be transmitted elapses, the control unit 120 determines that there is no communication device 100 (at least the owner device) participating in the object around the communication device 100. Then, the control unit 120 stores the fact that there is no communication device 100 participating in the object.

(Docking Process)

Figure 17:
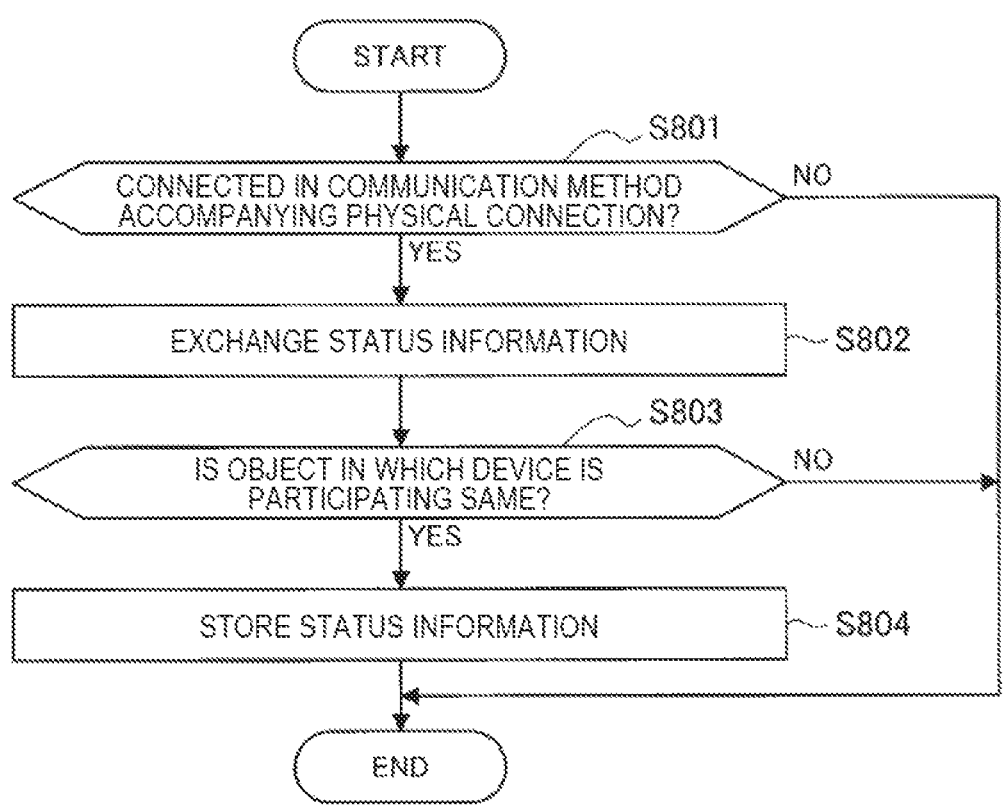
FIG. 17 is a flowchart conceptually illustrating an example of a docking process of a communication device according to an embodiment of the present disclosure.

Next, a process relating to a docking process will be described with reference to FIG. 17. FIG. 17 is a flowchart conceptually illustrating an example of the docking process of the communication device 100 according to an embodiment of the present disclosure.

The communication device 100 determines whether the communication device is in connection to another communication device 100 in a communication method accompanying a physical connection (Step S801). Specifically, the wired communication unit 140 determines whether it is in connection to another communication device 100.

When it is determined that the communication device is in connection to another communication device 100 in a communication method accompanying a physical connection (YES in Step S801), the communication devices 100 exchange status information (Step S802). Specifically, the control unit 120 generates status information indicating a status of a transmission function, a reception function, or the like of the communication device 100. Then, the control unit 120 causes the wired communication unit 140 to transmit a status information signal having the generated status information.

Next, when the communication device 100 determines that the object in which the communication device is participating is the same as that of the connected communication device 100 (Step S803). Specifically, the control unit 120 ascertains the object in which the other communication device 100 is participating using the status information obtained from the other communication device 100. Then, the control unit 120 determines whether the ascertained object is the same as the object in which the communication device 100 is participating.

When it is determined that the object in which the communication device is participating is the same as that of the connected communication device 100 (YES in Step S803), the communication device 100 stores the status information (Step S804). Specifically, the control unit 120 adds the obtained status information to the object management information.

1.5. Summary of Embodiment of Present Disclosure

As described above, according to an embodiment of the present disclosure, the communication devices 100 generate a first frame in which role information specifying a communication role set for a group of at least one communication device in communication with an outside of the group is stored and transmits the first frame. Costs for communication devices were incurred in various viewpoints in the past. Communication devices generally have both transmission function and reception function, for example, even though they are devices that frequently execute only either transmission or reception. For this reason, costs are incurred for manufacturing such communication devices. In addition, costs are also incurred in viewpoints of power consumption or calculation resources since both transmission function and reception function are caused to work.

On the other hand, the above-described costs can be reduced according to the communication devices 100 if only communication in accordance with communication roles for a formed object is executed and communication results are shared within the object. For example, manufacturing costs can be reduced by causing communication devices to include only a frequently used function among the transmission function and the reception function. In addition, even in a case in which both the transmission function and the reception function are included, power consumption can be reduced by making one of the functions inactive (i.e., stopping one function from working). Therefore, costs incurred for the communication devices 100 can be reduced while maintaining the communication function. In addition, since it is better for the communication devices 100 serving as constituent elements of the object to communicate in accordance with their communication roles, even if their communication functions are incompetent, they can be replaced with other communication devices 100 that can fulfill the same communication roles. In addition, since the communication roles within the object are divided, even a communication device 100 not having part of the communication functions can be added to the object as constituent elements thereof if the device can be supplemented by another communication device 100 within the object. Therefore, a user can freely select constituent elements of the object to some extent.

In addition, the above-described first frame includes a participation request frame relating to a request for participation in the group, and the communication devices 100 control generation of the participation request frame in which role information is stored on the basis of group information regarding the group and transmits the participation request frame. Thus, since the role information is shared at the time of participation in the object, the role information of the communication devices 100 participating in the object can be reliably managed. In particular, as the existing mechanism such as the association process is used for communication of the participation request frame, the communication devices 100 can be easily implemented.

In addition, the communication devices 100 transmit a report frame in which the group information is stored and receive a participation request frame in which role information is stored as first wireless communication devices. In addition, the communication devices 100 receive a report frame in which the group information is stored from a first wireless communication device, control generation of a participation request frame on the basis of the group information stored in the report frame, and transmit the participation request frame to the first wireless communication device. Thus, the communication devices can surely participate in a desired object since object information regarding the object is reported from the owner device or a member device relating to the object. Note that the group information (i.e., the object information) may be obtained through an input of a user or an instruction from an application via the interface unit 111.

In addition, the role information stored in the participation request frame includes information specifying the communication role of the transmission source of the participation request frame. Thus, the object management information can be updated by adding the role information stored in the received participation request frame to the object management information without change. Therefore, the updating process of the object management information can be simplified.

In addition, the above-described first frame includes a participation response frame communicated as a response to the participation request frame relating to the request for participating in the group. Thus, the role information of a communication device 100 that has already participated in the object can be shared for a communication device 100 newly participating in the object without using a separate frame. Thus, the role information can be shared without increasing a communication amount.

In addition, the role information stored in the participation response frame includes information specifying the communication roles of communication devices participating in the group. Thus, it is possible to prevent communication for sharing the role information between the communication devices 100 included in the object from being separately executed each time new participation in the object occurs.

In addition, the above-described first frame includes a participation report frame destined for a communication device participating in the group, the frame transmitted on the basis of reception of the participation request frame relating to the request for participation in the group. Thus, role information of a new participating communication device 100 can be shared with the communication devices 100 participating in the object. Therefore, the communication amount can be reduced further than in a case in which the communication devices 100 share the role information separately. In addition, with respect to a communication device 100 whose new participation in the object is difficult to ascertain, the role information of the new participating communication device 100 can be shared.

In addition, the above-described first frame includes a maintenance response frame communicated as a response to a maintenance request frame for maintenance of the group destined for the communication devices participating in the group. Here, since the communication devices generally have portability, the devices may be moved. Thus, there is concern of the communication devices 100 being moved out of the communication range. As a result, the communication roles registered for the object are likely not to be fulfilled. To deal with this, by performing maintenance of the object management information such as the role information or the like within the object, the communication roles within the object can be optimized. Therefore, it is possible to increase sustainability of communication using the object.

In addition, the above-described first frame includes a maintenance report frame in which the role information communicated on the basis of the reception of the maintenance response frame is stored. Thus, it is possible to report the maintenance result to all the communication devices 100 participating in the object. Therefore, the communication amount can be reduced further than in a case in which the communication devices 100 share maintenance information, i.e., latest role information, individually. In addition, the entire communication devices 100 participating in the object can share the latest maintenance information, and thus information inconsistency can be prevented.

In addition, the above-described communication role includes at least one of transmission or reception. Thus, since transmission and reception are divided by the communication devices 100 participating in the object, the above-described costs for the communication devices 100 can be reduced while securing the communication function as the object.

In addition, the above-described communication role includes communication of data for specific use or of a specific type. Thus, a communication process to be performed can be adapted for the communication devices 100 by communicating only data corresponding to the communication devices 100. Therefore, a load and power consumption of the communication devices 100 caused by the communication process can be optimized.

In addition, the above-described role information is determined on the basis of information regarding a setting by a user or performance of the communication devices 100. Thus, the communication role based on intention of the user can be fulfilled. Therefore, an operation of the object intended by the user can be realized. In addition, the communication role in accordance with a capability of the communication devices 100 can be fulfilled. Therefore, it is possible to reduce a possibility of an unfeasible communication role being assigned.

In addition, communication methods between the communication devices participating in the group are different from communication methods used outside the group. Thus, it is possible to freely select a communication method regardless of communication methods for communication with the outside of the object. Therefore, communication can be performed without considering interference or the like occurring in the communication. In addition, even a communication device 100 having only one configuration of transmission and reception for communication with the outside of the object can perform transmission and reception with the communication devices 100 included in the object as long as the communication device has the transmission and reception functions for communication performed within the object.

In addition, the communication methods between the communication devices participating in the group include a communication method accompanying a physical connection, and the communication devices 100 perform communication using the communication method accompanying a physical connection. Thus, communication performance such as communication connectivity, a communication speed, and the like can be improved further when a wired communication method is used than when a wireless communication method is used. In addition, the user can visually ascertain the communication devices 100 participating in the object and can notice an error of a participation destination or the like.

In addition, the communication devices 100 communicate a status information signal relating to communication roles of the communication devices 100 using the communication method accompanying a physical connection. Thus, since the status information signal is communicated using the communication method accompanying a physical connection that brings higher communication performance, more accurate statuses of the communication devices 100 included in the object can be shared. Therefore, their communication roles can be optimized further in accordance with the statuses of the communication devices 100 participating in the object.

2. MODIFIED EXAMPLES

The embodiments of the present disclosure have been described above. Note that an embodiment of the present disclosure is not limited to the above-described examples. First to third modified examples of the present embodiment will be described below.

First Modified Example

Figure 18:
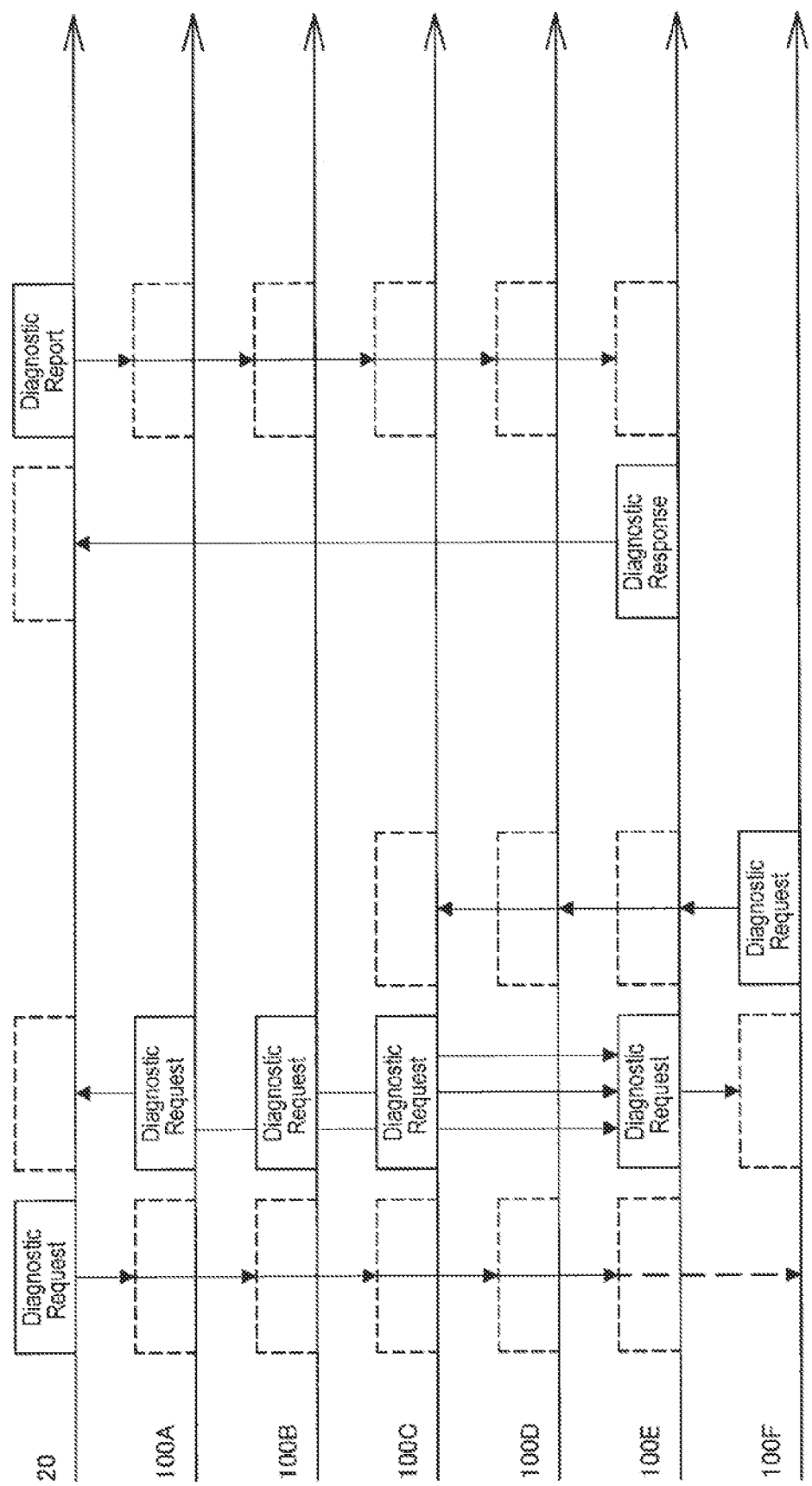
FIG. 18 is a frame sequence for describing a failure diagnosis function of a communication device according to a first modified example of an embodiment of the present disclosure.

As a first modified example of an embodiment of the present disclosure, maintenance of an object may be diagnosis of a failure of a communication device 100. Specifically, the communication device 100 communicates a failure diagnostic request frame and a failure diagnosis response frame. A failure diagnosis function will be described in detail with reference to FIG. 18. FIG. 18 is a frame sequence for describing a failure diagnosis function of a communication device 100 according to a first modified example of an embodiment of the present disclosure. Note that, in FIG. 18, the AP 20 is included in constituent elements of an object and the AP 20 operates as an owner device.

The owner device periodically transmits a failure diagnostic request frame to the member devices. For example, when a predetermined transmission time arrives, the AP 20 transmits a diagnostic request frame in which information such as an object ID is stored.

The member devices transmit failure diagnostic request frames in accordance with the reception of the failure diagnostic request frame. For example, the member devices 100A to 100C and 100E that have received the diagnostic request frame transfer diagnostic request frames. Here, since the member device 100D has an incompetent transmission function, it does not transfer a diagnostic request. In addition, since the member device 100F has not received the diagnostic request frame from the AP 20, it does not transfer the diagnostic request frame from the AP 20.

A member device also transmits a failure diagnostic request frame in accordance with the reception of the failure diagnostic request frame transferred by the member device. For example, although the member device 100F does not receive the diagnostic request frame from the AP 20, it receives the diagnostic request frame transferred by the member device 100E. Thus, the member device 100F transmits a diagnostic request frame in accordance with the reception of the transferred diagnostic request frame. Note that, since an upper limit (e.g., one) is set for the number of transfer operations, the phenomenon such as a broadcast stream is avoided.

In addition, a member device transmits a failure diagnostic response frame as a response to the failure diagnostic request frame. Specifically, the member device transmits the failure diagnostic response frame in accordance with the reception of the failure diagnostic request frame. For example, upon receiving diagnostic request frame, the each of the member devices transmits a diagnostic response frame. In addition, in a case in which the member device receives a failure diagnostic request frame from another member device after transmitting a failure diagnostic request frame, the member device may delay transmission of a failure diagnostic response frame. For example, the member devices 100C and 100E stand by for a predetermined time after transmission of diagnostic request frames. The reason for this is that there is a possibility of the transferred diagnostic request frames being further transferred by another member device 100. The member devices 100C and 100E receive a diagnostic request frame from the member device 100F during the standby time. Thus, the member devices 100C and 100E delay transmission of a diagnostic response frame by further standing by for a predetermined time.

The member devices transmit the failure diagnostic response frame after standing by for the predetermined time. Here, only some member devices among the member devices that have received the failure diagnostic request frames transmit the failure diagnostic response frame. For example, the member device 100E that has received the diagnostic request frame from the other member devices 100A to 100C and 100F transmits a diagnostic response frame to the AP 20 on behalf of them. The member device 100E updates role information and status information on the basis of a reception situation of the diagnostic request frame. Then, the member device 100E transmits a diagnostic response frame in which role information and status information are stored. For example, the diagnostic response frame stores, as the status information, that the member device 100D is likely to have an incompetent transmission function or incompetent reception function, the member device 100F is not located within the communication range of the AP 20, and the like.

In addition, the owner device transmits a failure diagnostic report frame in which updated role information and status information are stored to the member devices on the basis of the reception of the failure diagnostic response frame. For example, the AP 20 updates object management information stored in itself on the basis of the role information and the status information stored in the received diagnostic response frame. Then, the AP 20 causes the data processing unit 110 to generate the diagnostic report frame in which the updated role information and status information are stored. Then, the wireless communication unit 130 transmits the generated diagnostic report frame.

The member devices that have received the failure diagnostic report frame update the object management information. For example, the member devices 100A to 100E update the object management information for the object in which the devices are participating on the basis of the role information and the status information stored in the received diagnostic report frame. Note that, since the member device 100F does not receive the diagnostic report frame directly from the AP 20, the other member devices including the member device 100E and the like may transfer the diagnostic report frame. In addition, in a case in which the communication devices 100 included in the object are docking at each other, the role information and the status information may be shared using communication of a wired communication method or the like different from the communication method used in the communication of the diagnostic report frame.

As described above, according to the first modified example, the maintenance of the object is a failure diagnosis of the communication devices 100. Thus, the status information of the communication devices 100 can also be collected simultaneously with ascertainment of their presence. Therefore, more accurate statuses of the communication devices 100 participating in the object can be ascertained. Accordingly, their communication roles can be changed to roles more suitable for a situation as well.

In addition, a communication device 100 transmits a maintenance request frame in accordance with reception of a maintenance request frame. Thus, it is possible to cause a member device located in a distance in which it is not possible to directly receive the maintenance request frame to receive the maintenance request frame. Therefore, a reason for non-reception of a maintenance response frame can be specified more easily. For example, because that a device is not located within the range of direct communication is excluded from the reason for non-reception of a maintenance response frame, the reason narrows down to communication functional incompetence.

In addition, in a case in which a maintenance request frame is received from another communication device after the transmission of the maintenance request frame, the communication device 100 delays transmission of a maintenance response frame. Thus, it is possible to avoid a collision of the maintenance response frame with a maintenance request frame transferred from a member device located in a distance in which the maintenance request frame is not directly received. Therefore, a situation of the member devices included in the object can be ascertained more reliably. In addition, by preventing failure in communication of the maintenance response frame, deterioration in communication efficiency can be prevented.

Second Modified Example

Figure 19:
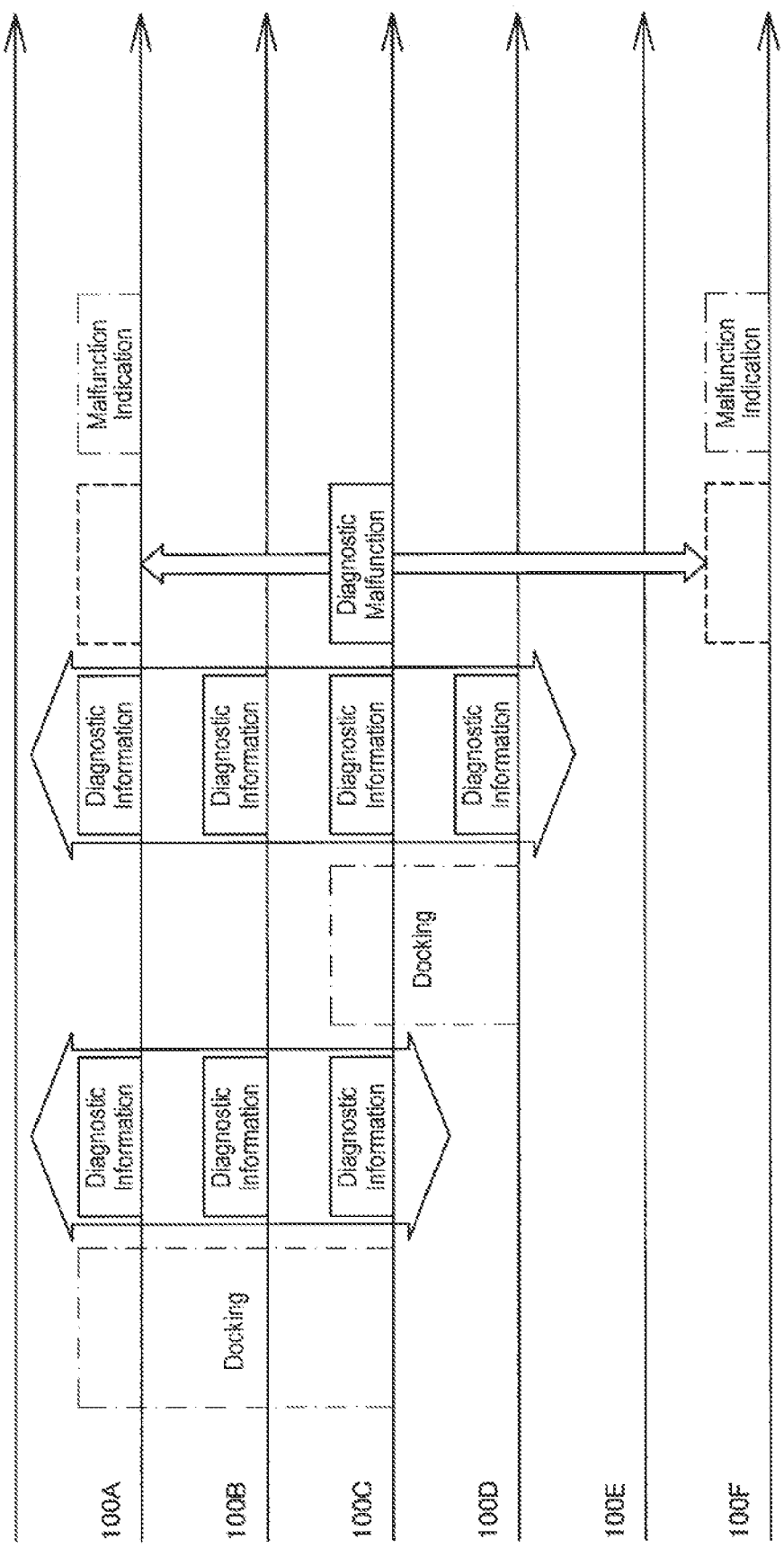
FIG. 19 is a signal sequence for describing a failure diagnosis result sharing function using a communication method accompanying docking in a communication device according to a second modified example of an embodiment of the present disclosure.

As a second modified example of an embodiment of the present disclosure, a failure diagnosis result may be shared using a communication method accompanying docking Specifically, when a communication device 100 docks itself with another communication device 100, the communication device reports a failure diagnosis result to the other communication device 100 using communication of a wired communication method. Then, the communication device 100 stores the failure diagnosis result obtained from the communication device 100 that is the docking partner and updates object management information on the basis of the failure diagnosis result. Sharing of a failure diagnosis result using a communication method accompanying docking will be described in detail with reference to FIG. 19. FIG. 19 is a signal sequence for describing a failure diagnosis result sharing function using a communication method accompanying docking in a communication device 100 according to a second modified example of an embodiment of the present disclosure.

The communication device 100 reports a failure diagnosis result to another communication device 100 it is docking with after the docking. For example, when the communication devices 100A to 100C dock with each other, failure diagnosis information is shared by the communication devices 100A to 100C via communication using a wired communication method. Likewise, when the communication devices 100C and 100D dock with each other, the failure diagnosis information is shared by the communication devices 100A to 100C that have already docked with each other and the communication device 100D via communication using the wired communication method. Note that a failure diagnosis may be executed at the time of docking.

Furthermore, the communication device 100 may report a failure diagnosis result of another communication device 100 as a failure diagnosis result of the object to the user. Specifically, the communication device 100 reports a failure diagnosis result of another communication device 100 participating in the object in accordance with whether the device itself can report or not. A reporting function of a failure diagnosis result will be described in detail with reference to FIG. 19.

When a failure is found from a failure diagnosis result after docking, the communication device 100 determines whether reporting to the user is possible. For example, when the communication device 100C find its failure after docking with the communication devices 100A to 100D, the communication device determines whether display output is possible.

In a case in which it is determined that reporting to the user is not possible, the communication device 100 makes a request to another communication device 100 participating in the object for reporting. For example, when it is determined that display output is not possible, the communication device 100C transmits a diagnostic malfunction signal for making a request for reporting to the communication devices 100A and 100F having a display function.

The communication devices 100 that have received the request for reporting reports a failure diagnosis result to the user. For example, the communication devices 100A and 100F that have received the diagnostic malfunction signal display failure diagnosis information of the transmission source of the signal.

Figure 20:
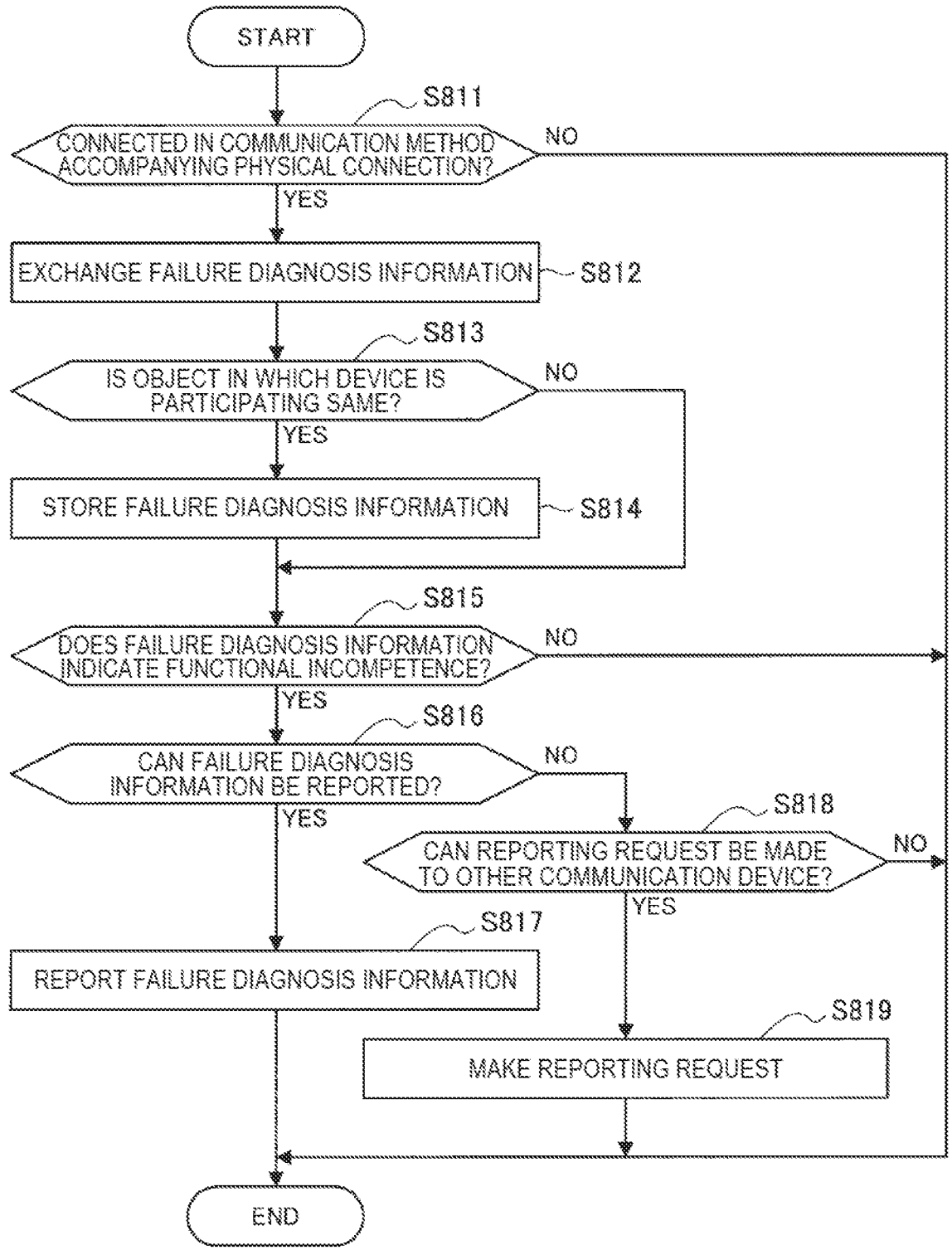
FIG. 20 is a flowchart conceptually illustrating an example of a process for sharing a failure diagnosis result using the communication method accompanying docking by the communication device according to the second modified example of an embodiment of the present disclosure.

Furthermore, a process for sharing a failure diagnosis result using the communication method accompanying docking will be described with reference to FIG. 20. FIG. 20 is a flowchart conceptually illustrating an example of a process for sharing a failure diagnosis result using the communication method accompanied with docking by the communication device 100 according to the second modified example of an embodiment of the present disclosure. Note that description of processes that are substantially the same as the above-described processes will be omitted.

When it is determined that the communication device 100 is connected to another communication device 100 in the communication method accompanying a physical connection (YES in Step S811), failure diagnosis information is exchanged (Step S812). Specifically, the control unit 120 executes a failure diagnosis for the communication function of the communication device 100. Then, the control unit 120 causes the wired communication unit 140 to transmit a failure diagnosis information signal in which information indicating a failure diagnosis result is stored.

Next, when it is determined that the object in which the communication device 100 is participating is the same as that of the connected communication device 100 (YES in Step S813), the communication device stores the failure diagnosis information (Step S814). Specifically, the control unit 120 stores the obtained failure diagnosis information for each object. Note that the failure diagnosis information may be added to object management information.

Next, the communication device 100 determines whether the failure diagnosis information indicates functional incompetence (Step S815). Specifically, the control unit 120 determines whether the failure diagnosis information of the communication device 100 indicates incompetence of the function relating to the communication role (e.g., the transmission function or the reception function). Note that the failure diagnosis information may include information regarding a function other than the communication function (e.g., a display function or a memory function).

When it is determined that the failure diagnosis information indicates functional incompetence (YES in Step S815), the communication device 100 determines whether it can report the failure diagnosis information (Step S816). Specifically, the control unit 120 determines whether it can report functional incompetence to the user using functions of the communication device 100. In more detail, the control unit 120 determines whether a display unit or an audio output unit is provided in the communication device 100 or each unit is normally operating.

When it is determined that the failure diagnosis information can be reported (YES in Step S816), the communication device 100 reports the failure diagnosis information to the user (Step S817). Specifically, the control unit 120 causes the display unit or the audio output unit to output the failure diagnosis information.

On the other hand, when it is determined that it is not possible to report the failure diagnosis information (NO in Step S816), the communication device 100 determines whether a reporting request can be made to another communication device 100 (Step S818). Specifically, the control unit 120 determines whether a communication device 100 with a display unit or an audio output unit is participating in the object.

When it is determined that a reporting request can be made to another communication device 100 (YES in Step S818), the communication device 100 makes a reporting request (Step S819). Specifically, the control unit 120 causes the wired communication unit 140 to transmit a diagnostic malfunction signal to the communication device 100 with a display unit or an audio output unit. Note that the control unit 120 may cause the wired communication unit 140 to transmit a diagnostic malfunction signal to all the communication devices 100 participating in the object without determining whether a reporting request can be made.

Note that, although the example in which the reporting method for a failure diagnosis result to the user is a display has been described above, the reporting method may be an audio output.

As described above, according to the second modified example, a failure diagnosis result is shared using the communication method accompanying docking. Here, power consumed in wired communication is generally lower than power consumed in wireless communication. For this reason, when failure diagnosis information is communicated in a wired communication method, power consumption of the communication devices 100 can be reduced. Therefore, sustainability of communication of the communication devices 100 can be improved.

In addition, the failure diagnosis information is reported to the user on the basis of communication of a failure diagnosis reporting request. Thus, even in a case in which the failing communication device 100 is not possible to report the failure to the user since the communication device does not have a communication function, another communication device 100 can report the failure instead. Therefore, a failure of the communication device 100 can be reported to users more reliably.

Third Modified Example

Figure 21:
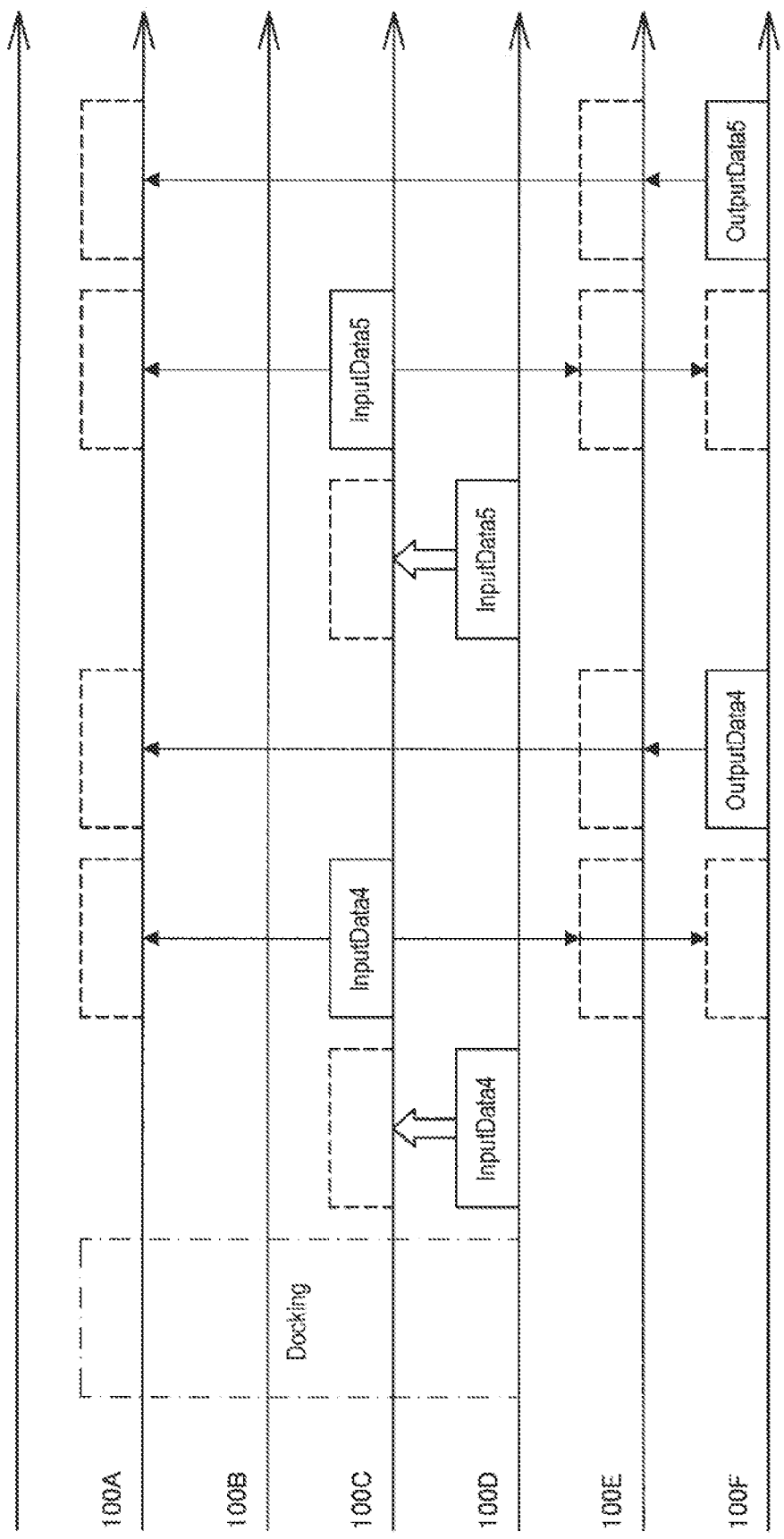
FIG. 21 is a signal sequence for describing a substitute communication function of a communication device according to a third modified example of an embodiment of the present disclosure.

As a third modified example of an embodiment of the present disclosure, a communication device 100 may perform communication on behalf of another communication device 100. Specifically, a communication device 100 performs communication in accordance with a communication role of another communication device (which will also be referred to as substitute communication below) on behalf of the communication device on the basis of at least one of role information or status information of the communication device. A substitute communication function will be described in detail with reference to FIG. 21. FIG. 21 is a signal sequence for describing the substitute communication function of a communication device 100 according to the third modified example of an embodiment of the present disclosure.

The communication device 100 determines whether an input information frame can be transmitted when an input occurs after docking. For example, the communication device 100D determines whether an input information frame can be transmitted when an input occurs in the communication device 100D after docking with the communication device 100A to 100D.

When it is determined that it is not possible to transmit an input information frame, the communication device 100 provides input information using wired communication to another communication device 100 that can perform wireless communication, together with a substitute communication request. For example, in a case in which it is not possible to transmit an input information frame due to transmission functional incompetence or the like, the communication device 100D provides input information (InputData4) together with information for making a request for substitute transmission to the communication device 100C whose transmission function is normally working via wired communication.

The communication device 100 that has been provided with the substitute communication request and the input information transmits the input information frame of the input information to a communication device 100 that is a destination. For example, the communication device 100C that has been provided with the substitute communication request and the input information via wired communication transmits the input information frame to the communication devices 100A, 100E and 100F, on behalf of the communication device 100D. Note that destination information is provided from the communication device 100D along with the input information or separately. In addition, the destination of the input information frame may be a communication device outside the object, such as the AP 20.

Then, when an output of the input information occurs, a communication device 100 that has received the input information frame transmits an output information frame in which output information is stored to another communication device 100 that is a destination. For example, when an output with respect to the input occurs on the basis of the input information frame, the communication device 100F transmits an output information frame to the communication devices 100A and 100E. Then, the communication devices 100A and 100E that have received the output information frame each output information on the basis of the output information.

Note that substitute communication may be repeatedly performed. For example, substitute communication may be performed from when a substitute communication request is reported until when a substitute communication cancellation is reported. In addition, substitute communication may be cancelled when a predetermined period of time elapses from the reporting of the substitute communication request or substitute communication has been performed a predetermined number of times. In addition, although the example in which substitute transmission is performed has been described above, substitute reception may be performed.

As described above, according to the third modified example, a communication device 100 performs communication in accordance with a communication role of another communication device on the basis of at least one of role information or status information of the communication device on behalf of the other communication device. Thus, even if a communication device 100 that is not capable of fulfill a communication role due to functional incompetence or the like is present within an object, the communication role can be substituted and thus a communication function as an object can be maintained. Therefore, sustainability of communication in units of objects can be improved.

3. APPLICATION EXAMPLES

The technology according to the present disclosure can be applied to various products. For example, the communication device 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the communication device 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the communication device 100 may be wireless communication modules mounted in such terminals (e.g., integrated circuit modules configured by one die).

On the other hand, for example, the communication device 100 (hereinafter, also referred to as an AP 100) may be realized as a wireless LAN access point (also referred to as a wireless base station) which has a router function or does not have a router function. The AP 100 may be realized as a mobile wireless LAN router. The AP 100 may also be a wireless communication module (e.g., an integrated circuit module configured with one die) mounted on such devices.

3-1. First Application Example

Figure 22:
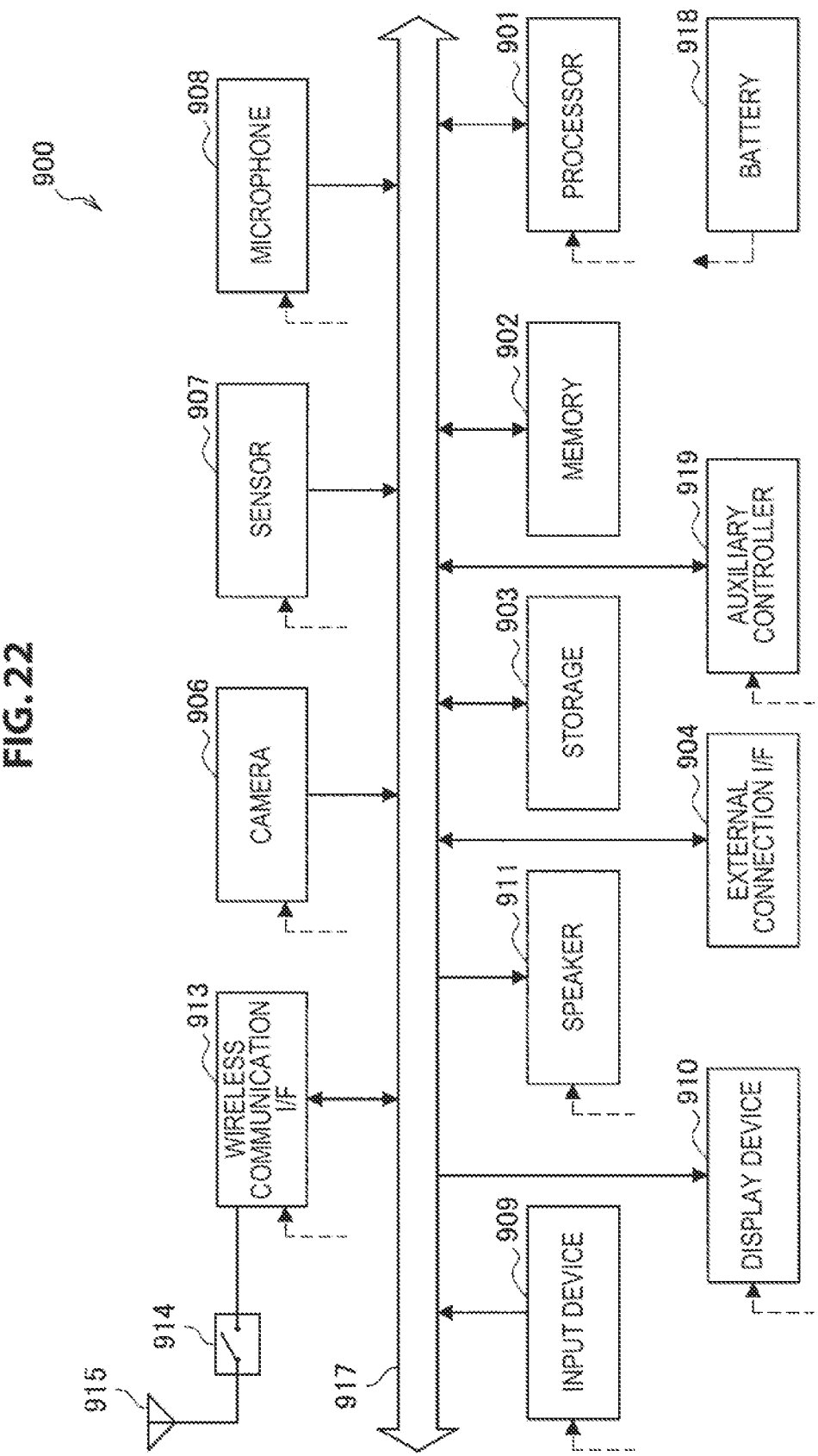
FIG. 22 is a block diagram illustrating an example of a schematic configuration of a smartphone.

FIG. 22 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication method such as a cellular communication method, a near-field communication method, or a proximity wireless communication method in addition to the wireless IAN method. The antenna switch 914 switches a connection destination of the antenna 915 among a plurality of circuits (e.g., circuits for different wireless communication methods) included in the wireless communication interface 913. The antenna 915 has a single or a plurality of antenna elements (e.g., a plurality of antenna elements constituting a MIMO antenna), and is used for transmission and reception of wireless signals through the wireless communication interface 913.

Note that the smartphone 900 may include a plurality of antennas (e.g., antennas for a wireless LAN or antennas for a proximity wireless communication method, or the like), without being limited to the example of FIG. 22. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 22 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 22, the data processing unit 110, the control unit 120, and the wireless communication unit 130 described above with reference to FIG. 3 may be implemented in the wireless communication interface 913. Further, at least some of the functions may be implemented in the processor 901 or the auxiliary controller 919. For example, the control unit 120 causes the data processing unit 110 to generate a first frame in which role information specifying a communication role in an object in which the smartphone 900 is participating in is stored. Then, the wireless communication unit 130 transmits the generated first frame. Accordingly, by fulfilling only the communication role reported using the first frame in the object in which the smartphone 900 is participating in, the smartphone can communicate with a communication device outside the object. Thus, functions other than one relating to the communication role may not be caused to work, and thus costs incurred for the communication device can be reduced while maintaining the communication function. Therefore, power consumption of the smartphone 900 can be reduced, and depletion of power stored in the battery 918 can be delayed.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 23:
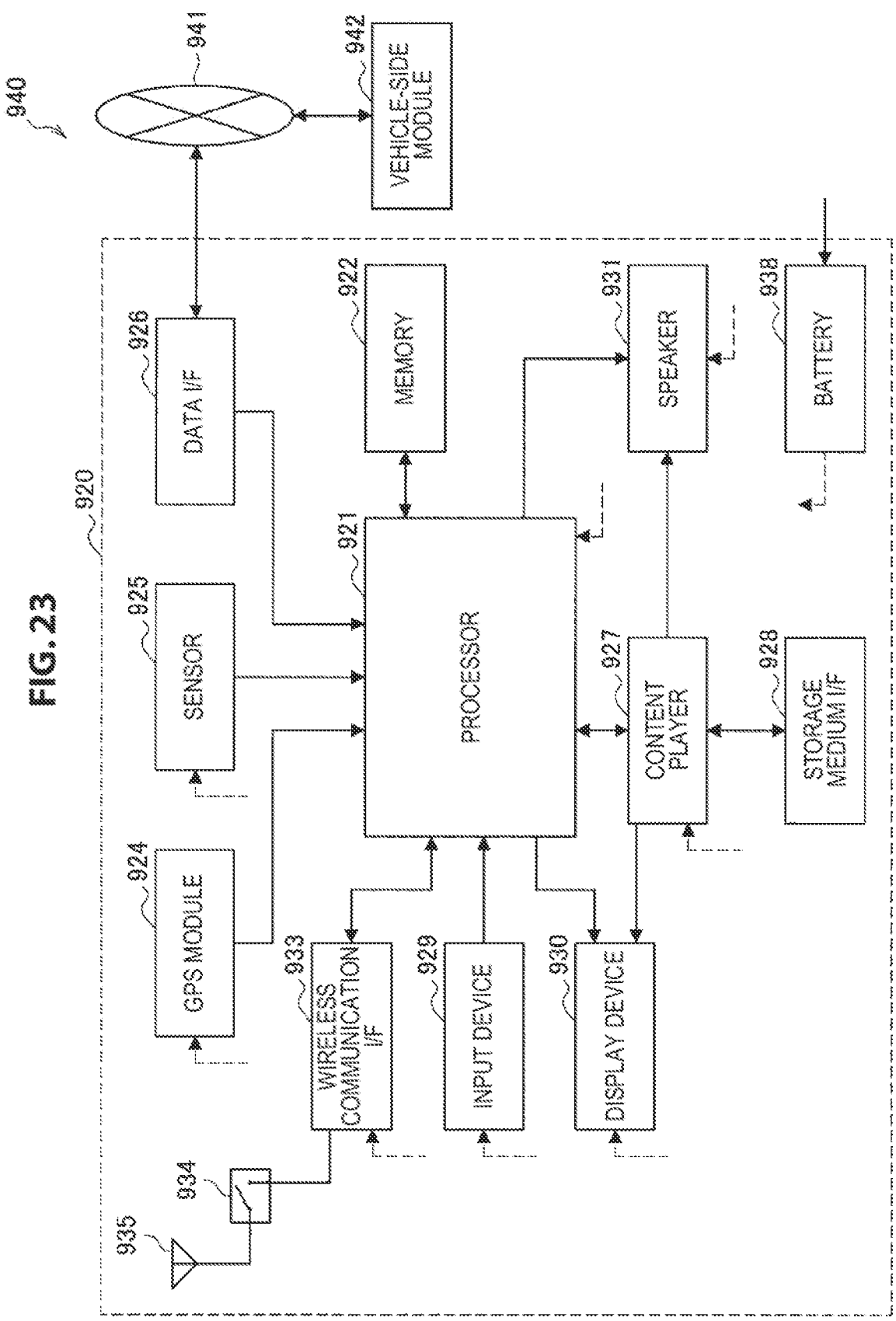
FIG. 23 is a block diagram illustrating an example of a schematic configuration of a car navigation device.

FIG. 23 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (e.g., latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (e.g., a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication method such as a near-field communication method, a proximity wireless communication method, or the cellular communication method in addition to the wireless LAN method. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 23. In this case, the antenna switch 934 may be omitted from the configuration of the car navigation device 920.

The battery 938 supplies electric power to each of the blocks of the car navigation device 920 illustrated in FIG. 23 via power supply lines partially indicated by dashed lines in the drawing. In addition, the battery 938 accumulates electric power supplied from the vehicle side.

In the car navigation device 920 illustrated in FIG. 23, the data processing unit 110, the control unit 120, and the wireless communication unit 130 described above with reference to FIG. 3 may be implemented in the wireless communication interface 933. Further, at least some of the functions may be implemented in the processor 921. For example, the control unit 120 causes the data processing unit 110 to generate a first frame in which role information specifying a communication role in an object in which the car navigation device 920 is participating in is stored. Then, the wireless communication unit 130 transmits the generated first frame. Accordingly, by fulfilling only the communication role reported using the first frame in the object in which the car navigation device 920 is participating in, the smartphone can communicate with a communication device outside the object. Thus, functions other than one relating to the communication role may not be caused to work, and thus costs incurred for the communication device can be reduced while maintaining the communication function. Therefore, power consumption of the car navigation device 920 can be reduced, and depletion of power stored in the battery 938 can be delayed.

In addition, the wireless communication interface 933 may operate as the above-described AP 100 and provide a wireless communication to a terminal of a user on board a vehicle. At this time, for example, the car navigation device 920 can comprehensively manage role information by managing an object. Thus, the car navigation device 920 can appropriately determine a communication device 100 that transmits frames to the car navigation device 920 and a communication device 100 that receives frames from the car navigation device 920. Thus, when a frame in which destination information has been set on the basis of a communication role is communicated from the car navigation device 920, the communication device 100 that communicates with the car navigation device 920 can perform a communication process with reference to the destination information, without determining execution of a communication process on the basis of the communication role. Accordingly, a load of the communication process can be reduced.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

FIG. 24 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (e.g., access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (e.g., a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 24, the data processing unit 110, the control unit 120, and the wireless communication unit 130 described above with reference to FIG. 3 may be realized by the wireless communication interface 963. In addition, at least a part of these functions may be implemented by the controller 951. For example, the wireless access point 950 can comprehensively manage role information by managing an object. Thus, the wireless access point 950 can appropriately determine a communication device 100 that transmits frames to the wireless access point 950 and a communication device 100 that receives frames from the wireless access point 950. Thus, when a frame in which destination information has been set on the basis of a communication role is communicated from the wireless access point 950, the communication device 100 that communicates with the wireless access point 950 can perform a communication process with reference to the destination information, without determining execution of a communication process on the basis of the communication role. Accordingly, a load of the communication process can be reduced.

4. CONCLUSION

According to an embodiment of the present disclosure described above, the above-described costs can be reduced by only executing communication in accordance with a communication role in a formed object and sharing a communication result within the object. For example, manufacturing costs can be reduced by providing only a function that is frequently used among a transmission function and a reception function. In addition, even in a case in which both the transmission function and the reception function are provided, power consumption can be reduced by making one of the functions inactive (i.e., stopping the function from working). Therefore, costs incurred for the communication device 100 can be reduced while the communication functions are maintained.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the communication method accompanying a physical connection has been described as being used in communication within the object in the above-described embodiment, for example, the present invention is not limited thereto. For example, a communication method other than the communication method accompanying a physical connection and a wireless LAN communication method may be used. For example, Bluetooth (registered trademark), ZigBee (registered trademark), NFC (Near Field Communication), infrared communication, or the like may be used for the communication within the object. In addition, a wireless communication method of a standard that is different from a standard for communication of the first frame may be used instead of the wired communication method. For example, 5 GHz band standard communication may be used for communication with the outside of the object, and 2.4 GHz band standard communication may be used for communication with the inside of the object.

In addition, although the example in which docking is performed after participation in the object (i.e., after the association process) has been described in the above-described embodiment, participation in an object may be performed taking docking as an opportunity.

In addition, although the example in which the object is formed in a star type network in which the communication device 100 is connected to the AP 20 as a station (STA) has been described in the above-described embodiment, an object may be formed in a mesh network.

In addition, although the example in which the owner device is fixed has been described in the above-described embodiment, the owner device may be changed. For example, in a case in which the owner device leaves the object due to movement or the like, a new owner device may be selected from the member devices included in the object.

In addition, although the example in which the object management information is shared by all the communication devices 100 included in the object has been described in the above-described embodiment, the object management information may be managed by a specific communication device 100 such as the owner device.

In addition, although the example in which the communication roles of the communication devices 100 are fixed after registration at the time of participation in the object has been mainly described in the above-described embodiment, the communication roles may be changed after registration. For example, the communication roles may be changed on the basis of role information, status information, failure diagnosis information, or the like of another communication device 100.

In addition, although the example in which the communication roles are determined by the member devices has been described in the above-described embodiment, the communication roles may be determined and reported by another communication device 100 such as the owner device. For example, a member device transmits an object participation request frame in which information specifying its own attribute or performance is stored to the owner device. The owner device determines a communication role on the basis of information indicating the attribute or performance of the communication device 100 stored in the received object participation request frame. Then, the owner device adds the communication role to the object management information and transmits an object participation response frame in which role information indicating the communication role is stored to the member device.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in communication device 100 to exhibit functions equivalent to those of the respective functional configurations of the aforementioned the communication device 100. In addition, a storage medium that stores the computer program therein is also provided.

Additionally, the present technology may also be configured as below.

(1)

A wireless communication device including:

a control unit configured to control generation of a participation request frame relating to a request for participation in a group, which includes at least one wireless communication device, in which role information specifying a communication role in communication with an outside of the group is stored on a basis of group information regarding the group; and a transmission unit configured to transmit the participation request frame.

(2)

The wireless communication device according to (1), further including:

a reception unit configured to receive a report frame in which the group information is stored from a first wireless communication device, in which the control unit controls generation of the participation request frame on the basis of the group information stored in the report frame, and the transmission unit transmits the participation request frame to the first wireless communication device.

(3)

The wireless communication device according to (2), in which the role information stored in the participation request frame includes information specifying a communication role of a transmission source of the participation request frame.

(4)

The wireless communication device according to (2),
in which the reception unit receives a maintenance request frame for maintenance of the group destined for a wireless communication device participating in the group, and
the transmission unit transmits a maintenance response frame in which the role information is stored as a response to the maintenance request frame.

(5)

The wireless communication device according to (4),
in which the transmission unit transmits the maintenance request frame in accordance with reception of the maintenance request frame.

(6)

The wireless communication device according to (5),
in which the transmission unit transmits the maintenance response frame in a case in which the maintenance request frame is received from another wireless communication device after the transmission of the maintenance request frame.

(7)

The wireless communication device according to any one of (2) to (6),
in which the transmission unit and the reception unit perform communication in accordance with the communication role of another wireless communication device on behalf of the other wireless communication device on a basis of at least one of the role information or status information of the wireless communication device.

(8)

The wireless communication device according to any one of (1) to (7),
in which the communication role includes at least one of transmission or reception.

(9)

The wireless communication device according to any one of (1) to (8),
in which the communication role includes communication of data for specific use or of a specific type.

(10)

The wireless communication device according to any one of (1) to (9),
in which the role information is determined on a basis of information regarding a setting by a user or performance of the wireless communication device.

(11)

The wireless communication device according to any one of (1) to (10),
in which a method of communication between wireless communication devices participating in the group is different from a method of communication with an outside of the group.

(12)

The wireless communication device according to (11),
in which the method of communication between wireless communication devices participating in the group includes a communication method accompanying a physical connection, the wireless communication device including:
a physical connection communication unit configured to perform communication using the communication method accompanying a physical connection.

(13)

The wireless communication device according to (12),
in which the physical connection communication unit communicates a status information signal relating to the communication role of the wireless communication device using the communication method accompanying a physical connection.

(14)

A wireless communication device including:
a transmission unit configured to transmit a report frame in which group information regarding a group including at least one wireless communication device is stored; and
a reception unit configured to receive a participation request frame relating to a request for participation in the group in which role information specifying a communication role in communication with an outside of the group is stored.

(15)

The wireless communication device according to (14),
in which the transmission unit transmits a participation response frame in which the role information is stored as a response to the participation request frame.

(16)

The wireless communication device according to (15),
in which the role information stored in the participation response frame includes information specifying a communication role of a wireless communication device participating in the group.

(17)

The wireless communication device according to any one of (14) to (16),
in which the transmission unit transmits a participation report frame destined for a wireless communication device participating in the group on a basis of reception of the participation request frame.

(18)

The wireless communication device according to any one of (14) to (17),
in which the transmission unit transmits a maintenance request frame for maintenance of the group destined for a wireless communication device participating in the group, and
the reception unit receives a maintenance response frame in which the role information is stored in response to the maintenance request frame.

(19)

The wireless communication device according to (18),
in which the transmission unit transmits a maintenance report frame in which the role information is stored on a basis of reception of the maintenance response frame.

(20)

A wireless communication method using a processor, the wireless communication method including:
generating a first frame in which role information specifying a communication role in communication with an outside of a group including at least one wireless communication device set for the group is stored; and
transmitting the first frame.

REFERENCE SIGNS LIST

100 communication device
110 data processing unit
120 control unit
130 wireless communication unit
140 wired communication unit

The invention claimed is:

1. A second wireless communication device comprising:
a receiver configured to receive, from a first wireless communication device, a report frame that includes group information regarding a group of wireless communication devices that includes the first wireless communication device and the second wireless communication device, control circuitry configured to control generation of a participation request frame relating to a request for participation in the group based on the group information, wherein role information of the participation request frame specifies a communication role of the second wireless communication device on behalf of the group relative to communication with a third wireless communication device outside of the group, and wherein the communication role on behalf of the group includes at least one of transmission, reception or communication of data for a specific use or of a specific type; and a transmitter configured to transmit the participation request frame to the first wireless communication device.

2. The second wireless communication device according to claim 1, wherein the receiver receives a maintenance request frame for maintenance of the group destined for a wireless communication device participating in the group, and the transmitter transmits a maintenance response frame in which the role information is stored as a response to the maintenance request frame.

3. The second wireless communication device according to claim 2, wherein the transmitter transmits the maintenance request frame in accordance with reception of the maintenance request frame.

4. The second wireless communication device according to claim 3, wherein the transmitter transmits the maintenance response frame in a case in which the maintenance request frame is received from another wireless communication device after the transmission of the maintenance request frame.

5. The second wireless communication device according to claim 1, wherein the transmitter and the receiver perform communication in accordance with the communication role of another wireless communication device on behalf of the other wireless communication device based on at least one of the role information or status information of the second wireless communication device.

6. The second wireless communication device according to claim 1, wherein the role information is determined based on information regarding a setting by a user or performance of the second wireless communication device.

7. The second wireless communication device according to claim 1, wherein a method of communication between wireless communication devices participating in the group is different from a method of communication with a wireless communication device outside of the group.

8. The second wireless communication device according to claim 7, wherein the method of communication between wireless communication devices participating in the group includes a communication method accompanying a physical connection, the second wireless communication device comprising:

physical connection communication circuitry configured to perform communication using the communication method accompanying a physical connection.

9. The second wireless communication device according to claim 8, wherein the physical connection communication circuitry communicates a status information signal relating to the communication role of the second wireless communication device using the communication method accompanying a physical connection.

10. A first wireless communication device comprising:
a transmitter configured to transmit, to a second wireless communication device, a report frame in which group information regarding a group of wireless communication devices that includes the first wireless communication device and the second wireless communication device; and a receiver configured to receive, from the second wireless communication device, a participation request frame relating to a request for participation in the group based on the group information, wherein role information of the participation request frame specifies a communication role of the second wireless communication device on behalf of the group relative to communication with a third wireless communication device outside of the group, and wherein the communication role on behalf of the group includes at least one of transmission, reception or communication of data for a specific use or of a specific type.

11. The first wireless communication device according to claim 10, wherein the transmitter transmits a participation response frame in which the role information is stored as a response to the participation request frame.

12. The first wireless communication device according to claim 11, wherein the role information stored in the participation response frame includes information specifying a communication role of a wireless communication device participating in the group.

13. The first wireless communication device according to claim 10, wherein the transmitter transmits a maintenance request frame for maintenance of the group destined for a wireless communication device participating in the group, and the receiver receives a maintenance response frame in Which the role information is stored in response to the maintenance request frame.

14. The first wireless communication device according to claim 13, wherein the transmitter transmits a maintenance report frame in which the role information is stored based on reception of the maintenance response frame.

15. A wireless communication method using a processor of a second wireless communication device, the wireless communication method comprising:

receive, from a first wireless communication device, a report frame that includes group information regarding a group of wireless communication devices that includes the first wireless communication device and the second wireless communication device;

generating a first frame in which role information specifying a communication role in communication with an outside of the group based on the group information, wherein role information of the participation request frame specifies a communication role of the second wireless communication device on behalf of the group relative to communication with a third wireless communication device outside of the group, and wherein the communication role on behalf of the group includes at least one of transmission, reception or communication of data for a specific use or of a specific type; and transmitting the first frame to the first wireless communication device.

16. A wireless communication method using a processor of a first wireless communication device, the wireless communication method comprising:

transmitting, to a second wireless communication device, a report frame that includes group information regarding a group of wireless communication devices that includes the first wireless communication device and the second wireless communication device; and receiving, from the second wireless communication device, a participation request frame relating to a request for participation in the group based on the group information, wherein role information of the participation request frame specifies a communication role of the second wireless communication device on behalf of the group relative to communication with a third wireless communication device outside of the group, and wherein the communication role on behalf of the group includes at least one of transmission, reception or communication of data for a specific use or of a specific type.

* * * * *